United States Patent
Ibrahim et al.

(10) Patent No.: US 12,537,569 B2
(45) Date of Patent: Jan. 27, 2026

(54) PRECODING CODEBOOK FOR LOS MIMO

(71) Applicant: QUALCOMM Incorporated, San Diego, CA (US)

(72) Inventors: Abdelrahman Mohamed Ahmed Mohamed Ibrahim, San Diego, CA (US); Pinar Sen, San Diego, CA (US); Renqiu Wang, San Diego, CA (US); Naga Bhushan, San Diego, CA (US); Peter Gaal, San Diego, CA (US); Yu Zhang, San Diego, CA (US); Seyong Park, San Diego, CA (US); Muhammad Sayed Khairy Abdelghaffar, San Jose, CA (US); Krishna Kiran Mukkavilli, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 35 days.

(21) Appl. No.: 18/575,280

(22) PCT Filed: Aug. 17, 2021

(86) PCT No.: PCT/CN2021/112909
§ 371 (c)(1),
(2) Date: Dec. 28, 2023

(87) PCT Pub. No.: WO2023/019416
PCT Pub. Date: Feb. 23, 2023

(65) Prior Publication Data
US 2024/0333349 A1    Oct. 3, 2024

(51) Int. Cl.
*H04B 7/02* (2018.01)
*H04B 7/0456* (2017.01)

(52) U.S. Cl.
CPC ......... *H04B 7/0478* (2013.01); *H04B 7/0456* (2013.01)

(58) Field of Classification Search
CPC ... H04B 7/0456; H04B 7/0469; H04B 7/0478
(Continued)

(56) References Cited

U.S. PATENT DOCUMENTS

2014/0192916 A1* 7/2014 Gomadam ........... H04B 7/0478
                                                              375/267
2018/0191411 A1   7/2018 Faxér et al.
(Continued)

FOREIGN PATENT DOCUMENTS

WO   2008086239 A1   7/2008
WO   2018102163 A1   6/2018

OTHER PUBLICATIONS

International Search Report and Written Opinion—PCT/CN2021/112909—ISA/EPO—Feb. 25, 2022.

*Primary Examiner* — Helene E Tayong
(74) *Attorney, Agent, or Firm* — Procopio, Cory, Hargreaves, & Savitch LLP

(57) ABSTRACT

A base station may identify a first antenna configuration of the base station and a second antenna configuration of a wireless device. The base station may select one or more codebook-based precoders for communication with the wireless device with LOS MIMO. The one or more codebook-based precoders may include at least one of a Legendre precoder, a block-DFT precoder, a DFT precoder, a block-Walsh precoder, a Walsh precoder, a block-Legendre precoder, a Kronecker Legendre precoder, a Kronecker block-DFT precoder, or a Kronecker block-Walsh precoder. The base station may transmit, to a wireless device, an indication of a second codebook-based precoder for transmission from the wireless device to the base station with LOS MIMO. The base station and the wireless device may (Continued)

communicate with each other with LOS MIMO based on one or more codebook-based precoders.

30 Claims, 12 Drawing Sheets

(58) Field of Classification Search
USPC .......................................................... 375/267
See application file for complete search history.

(56) References Cited

U.S. PATENT DOCUMENTS

2020/0220592 A1    7/2020  Ryu et al.
2020/0382177 A1*  12/2020  Lee ...................... H04B 7/0456
2020/0388935 A1   12/2020  Lee et al.

\* cited by examiner

PRECODING CODEBOOK FOR LOS MIMO

CROSS-REFERENCE TO RELATED APPLICATIONS

This application claims the benefit of and priority to International Application No. PCT/CN2021/112909, entitled "DESIGN OF PRECODING CODEBOOK FOR LOS MIMO" and filed on Aug. 17, 2021, which is expressly incorporated by reference herein in its entirety.

TECHNICAL FIELD

The present disclosure relates generally to communication systems, and more particularly, to selection of codebook-based precoders for line-of-sight (LOS) multiple-input-multiple-output (MIMO)-based wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The apparatus may identify a first antenna configuration of the base station and a second antenna configuration of a wireless device. The apparatus may select one or more codebook-based precoders for communication with the wireless device with LOS MIMO. The apparatus may communicate with the wireless device with LOS MIMO based on the selected one or more codebook-based precoders.

In an aspect of the disclosure, a method, a computer-readable medium, and an apparatus are provided. The apparatus may be a wireless device. The apparatus may receive, from a base station, an indication of a second codebook-based precoder for transmission from the wireless device to the base station with LOS MIMO. The apparatus may communicate with the base station with LOS MIMO based on one or more codebook-based precoders including the second codebook-based precoder.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
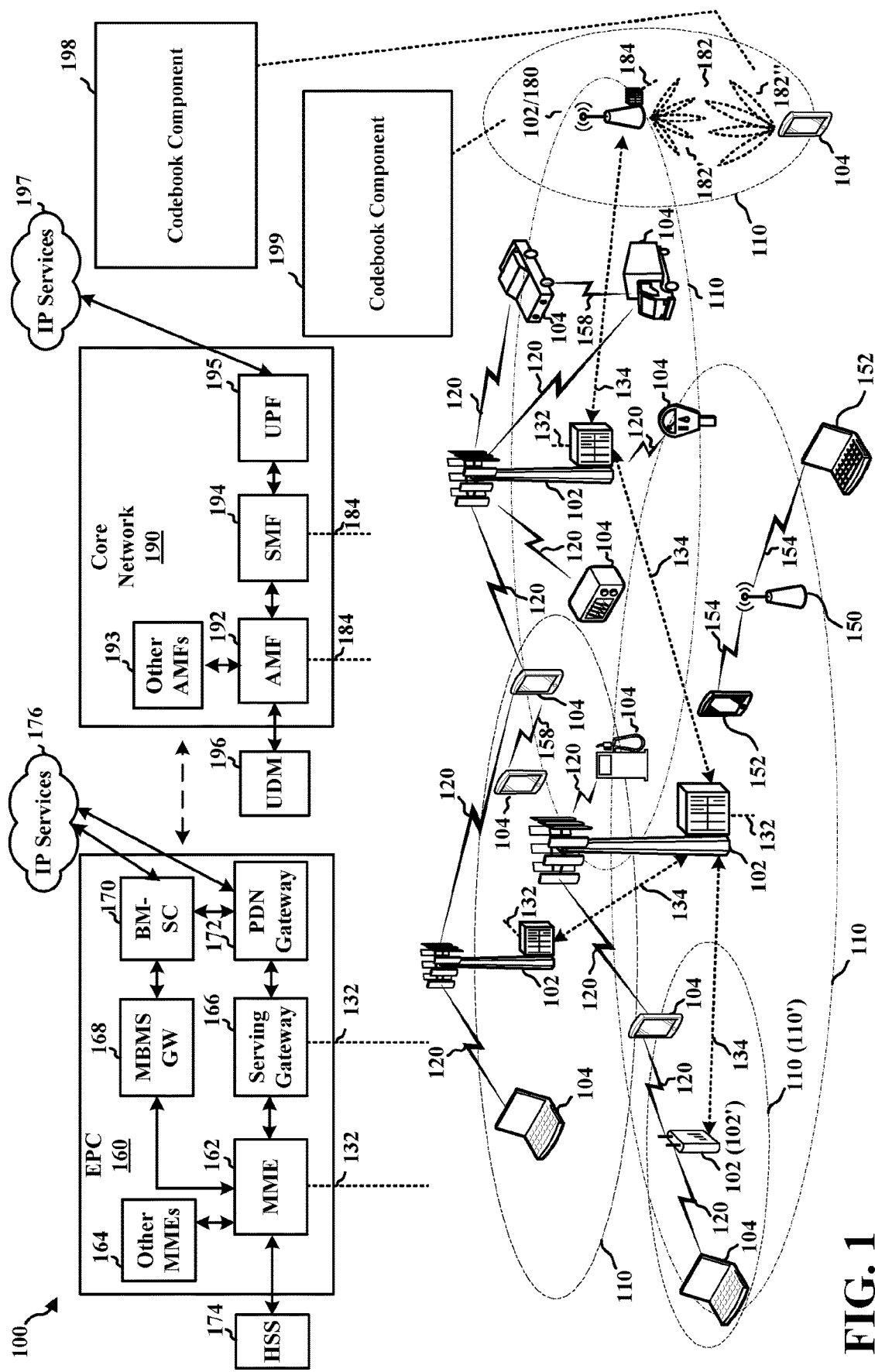
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, cNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 (or a relay node, an integrated access and backhaul (IAB) node, a repeater, or a customer premises equipment (CPE), etc.) may include a codebook component 198 that may be configured to receive, from a base station, an indication of a second codebook-based precoder for transmission from the wireless device to the base station with LOS MIMO. The codebook component 198 may be configured to communicate with the base station with LOS MIMO based on one or more codebook-based precoders including the second codebook-based precoder. In certain aspects, the base station 180 may include a codebook component 199 that may be configured to identify a first antenna configuration of the base station and a second antenna configuration of a wireless device. The codebook component 199 may be configured to select one or more codebook-based precoders for communication with the wireless device with LOS MIMO. The codebook component 199 may be configured to communicate with the wireless device with LOS MIMO based on the selected one or more codebook-based precoders. Although the following description may be focused on 5G NR, the concepts described herein may be applicable to other similar areas, such as LTE, LTE-A, CDMA, GSM, and other wireless technologies.

Figure 2:
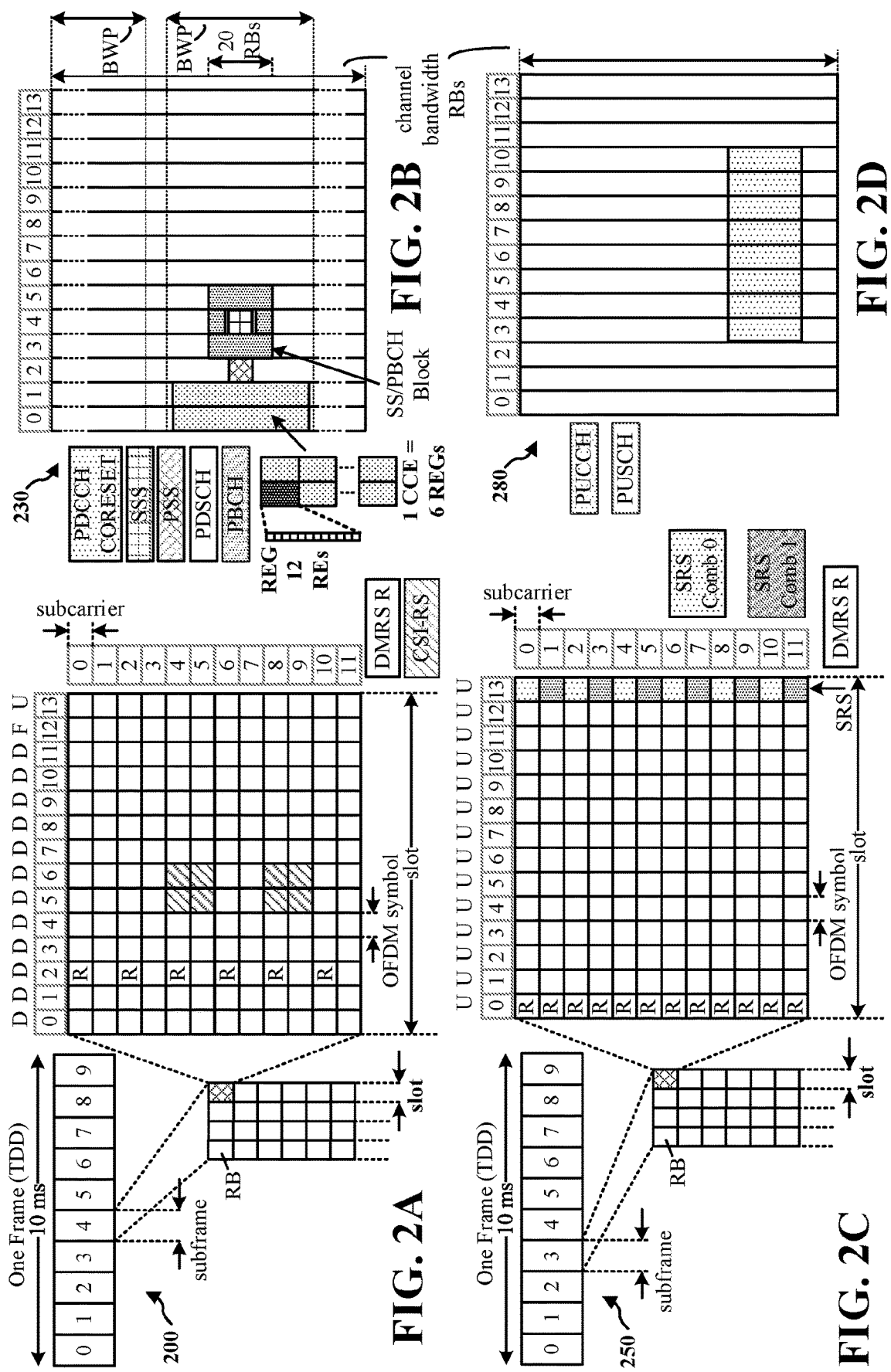
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2\mu$ slots/subframe. The subcarrier spacing may be equal to $2\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
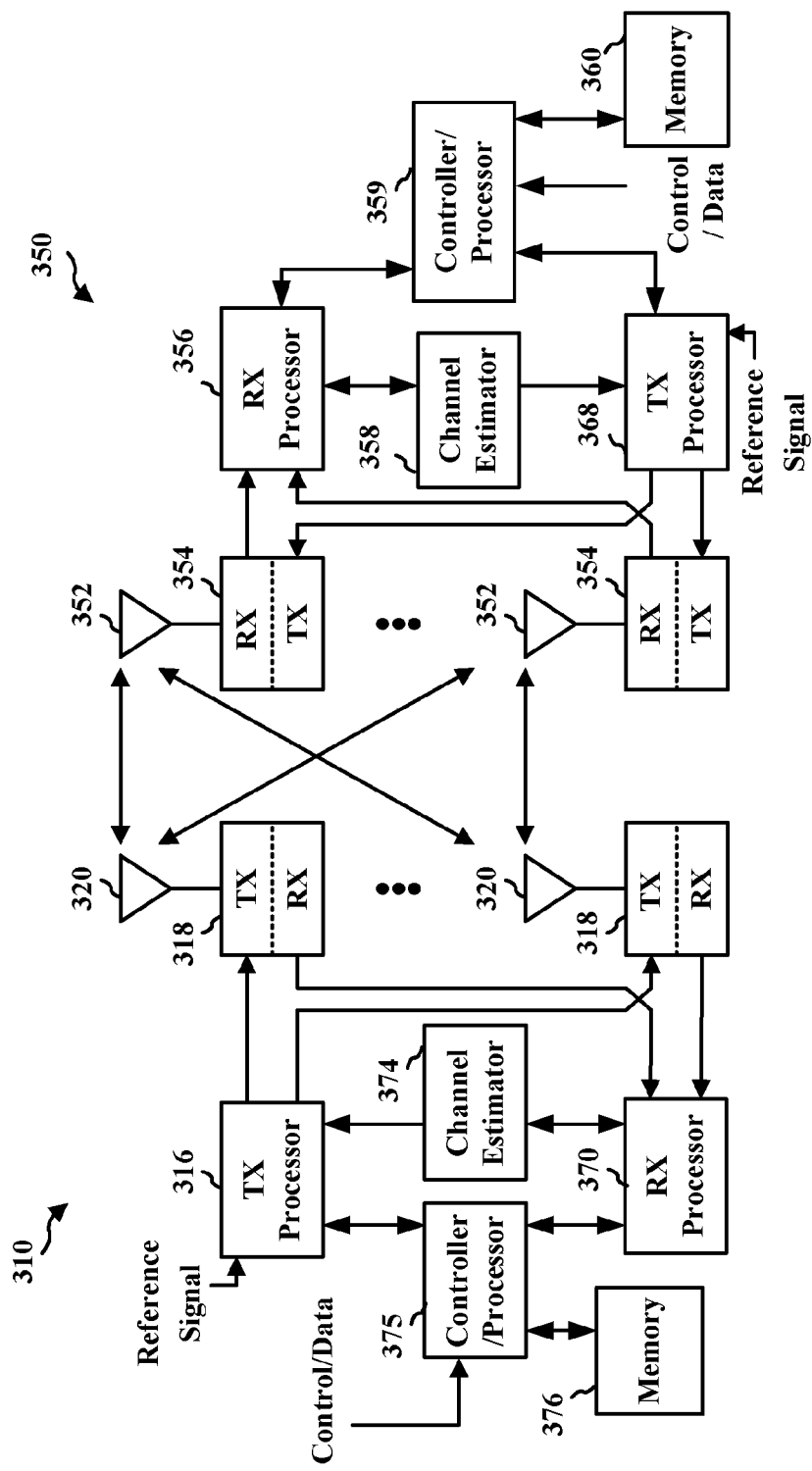
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX, Tx) processor 316 and the receive (RX, Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

One or more aspects relate to LOS MIMO (LSM) and massive MIMO in wireless communication. According to the Rician fading channel model, a Rician fading channel may include an LOS part and a non-LOS part, and the channel fading may be modeled as: $H=aH_{LOS}+bH_{NLOS}$, where NLOS may refer to non-line-of-sight, $$H_{LOS} = \frac{\exp\left(-i2\pi\frac{r_{jk}}{\lambda}\right)}{\frac{r_{jk}}{\lambda}},$$

$H_{NLOS}\epsilon$
{independent and identically distributed (i.i.d.) Rayleigh, clustered delay line (CDL)–x, tapped delay line (TDL)–x}, r may be a distance between the Tx and Rx antennas or antenna arrays, k may be a distance-dependent phase change, λ may be the signal wavelength, $a^2+b^2=1$, and the LOS percentage=$a^2$.

With LSM, circular, one-dimensional (1D), or two-dimensional (2D) antenna arrays may be used. The channel matrix may include a strong LOS component (i.e., a>>b) that may dominate the channel. Further, the singular value decomposition (SVD)-based precoder may be implicit with LSM, and the communication may benefit from the special structure of the channel (e.g., with a limited or no channel state feedback (CSF)). On the other hand, with massive MIMO, 1D or 2D antenna arrays may be used. The channel matrix may include a weak LOS component (i.e., a<b). Further, the SVD-based precoder may be explicit with massive MIMO, and the CSF may be used at the Tx side to compute the SVD.

Figure 4:
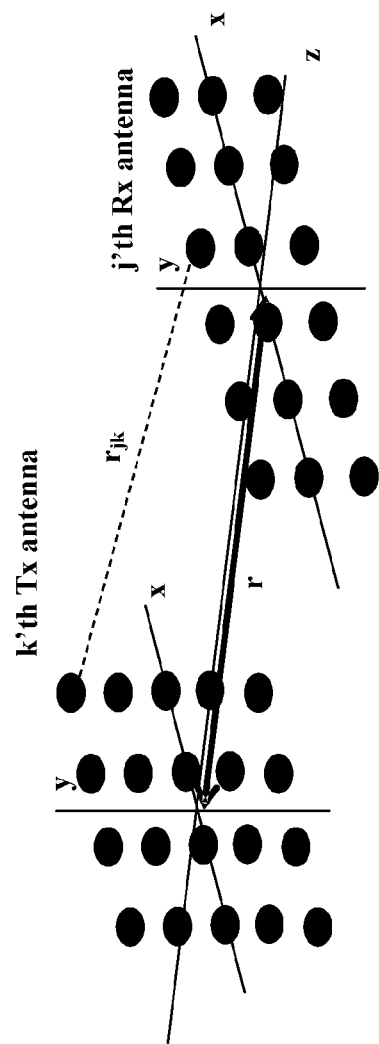
FIG. 4 is a diagram illustrating example Tx and Rx 2D uniform linear arrays (ULAs).

FIG. 4 is a diagram 400 illustrating example Tx and Rx 2D uniform linear arrays (ULAs). As illustrated, the antenna array at the Tx side may be a 4×5 2D ULA, and the antenna array at the Rx side may be a 6×3 2D ULA. The Tx and Rx 2D ULAs may be separated by a distance r. Also, $r_{jk}$ may denote a distance between the antenna or antenna element j at the Rx side and the antenna or antenna element k at the Tx side. Further, $r_{jk}$ may be dependent on the configuration of the Tx and Rx antenna arrays for some antennas or antenna elements j or some antennas or antenna elements k.

The structure of an LOS MIMO channel may be exploited to achieve a high multiplexing gain:

$$h_{mn} \propto \frac{\exp\left(-i2\pi \frac{r_{mn}}{\lambda}\right)}{r_{mn}}.$$

The LOS MIMO gain may decrease as the distance between the transmitter and the receiver increases. In one example, all multiplexing gain may vanish at 10,000 times the signal wavelength (λ, lambda) (i.e., 10,000%). For a signal frequency of 3.5 GHZ, 1000λ may be equal to 85 m. The maximum distance where the LOS MIMO gain may be achieved may depend on the product of Tx and Rx antenna apertures. The spectral efficiency factor may be the ratio between the achievable spectral efficiency and the single mode capacity (i.e., $\log_2(1+N_r \times SNR)$ (where $N_r$ may refer to the number of Rx antennas or antenna elements, and SNR may refer to the signal-to-noise ratio). The spectral efficiency factor may be an indication of the spatial multiplexing gain.

LOS MIMO may provide a high multiplexing gain under certain conditions. For example, a shorter distance between the Tx and Rx antenna arrays may help to achieve a high multiplexing gain. In particular, it may be preferable if the distance between the Tx and Rx antenna arrays does not exceed a certain threshold that may depend on apertures of Tx and Rx antenna arrays and the carrier frequency. Further, an accurate LOS MIMO precoder may help to achieve a high multiplexing gain. The accuracy of the precoder may depend on one or more of the channel knowledge at the transmitter, the distance feedback, or the misalignment compensation capability.

LOS MIMO may be deployed in different scenarios. For example, LOS MIMO may be deployed in the backhaul link between the base station and a relay node (e.g., an IAB node, a repeater, such as a smart repeater, or a CPE, etc.). LOS MIMO may also be deployed in the access link between the base station or the relay node and a UE.

Accordingly, LOS MIMO multiplexing may be exploited to improve the system spectral efficiency. In one or more aspects, sufficiently accurate precoding may be provided for LOS MIMO communication.

Some devices may be associated with limited mobile termination (MT) capabilities. One example of such a device may be a repeater. A repeater may be a less costly device than an IAB node. Some other device may be associated with a limited sounding capability. In one or more aspects, sufficiently accurate precoding may be provided for LOS MIMO communication in order to achieve the multiplexing gain. In particular, codebook-based precoders may be utilized to realize the LOS MIMO gain.

Figure 5:
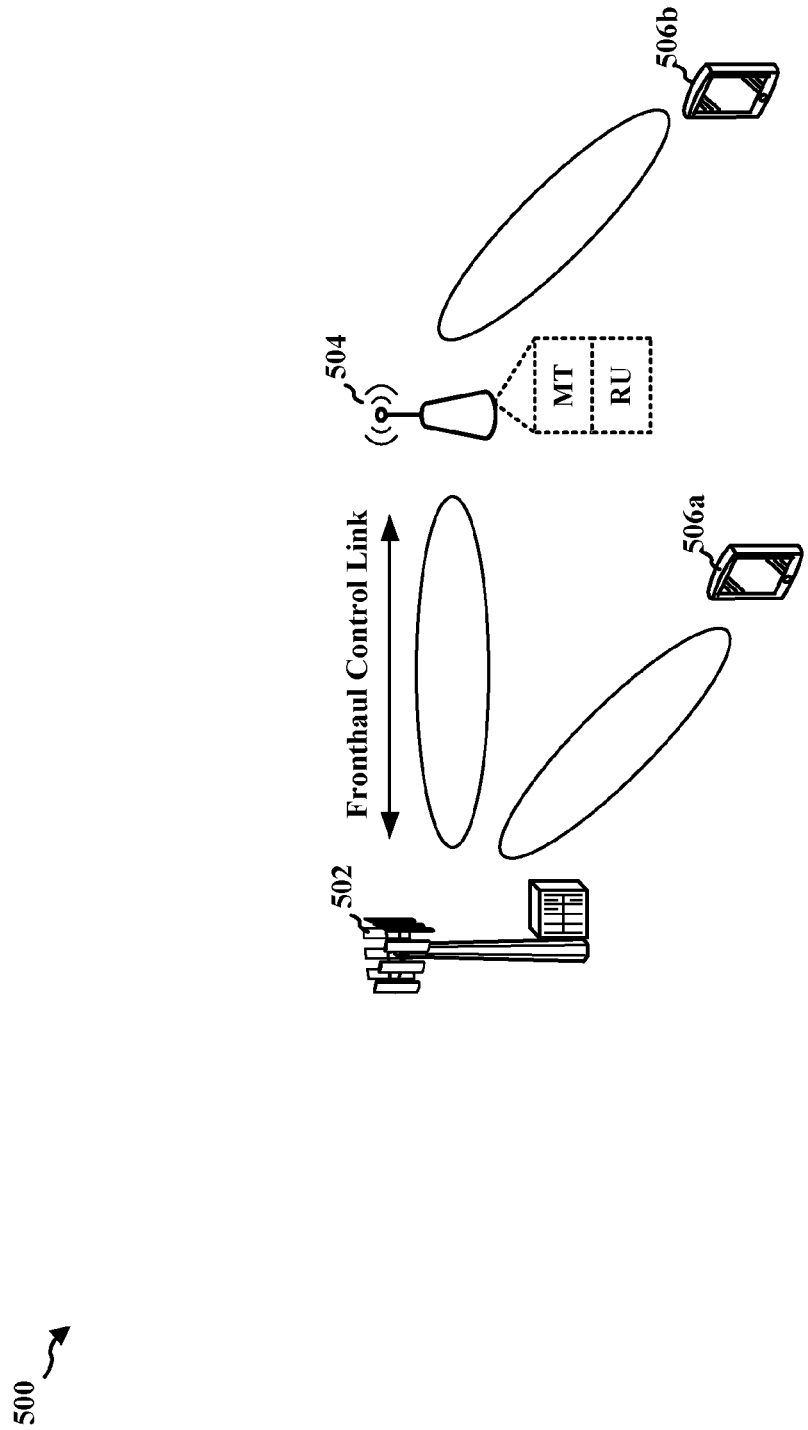
FIG. 5 is a diagram illustrating an example environment according to one or more aspects.

FIG. 5 is a diagram illustrating an example environment 500 according to one or more aspects. A direct access link may exist between the base station 502 and the UE 506a. A relayed access link may exist between the base station 502 and the UE 506b via a relay node 504. The relay node 504 may be an IAB node, a repeater, or a CPE, etc. In one example, the relay node 504 may be a repeater. The MT part of a repeater may lack some of the capabilities of a typical UE. Some of these UE capabilities may be optional in the MT of a repeater. Further, the MT may support control signaling for configuring the operation of the remote/repeating unit (RU) of the repeater. A fronthaul control link may be established between a base station (e.g., the base station 502) and the MT of a repeater, and may constitute a control path between the base station and the repeater. In different configurations, the fronthaul control link may be over FR2, and may be on a small BWP. The fronthaul control link may carry uplink or downlink signals to configure the repeater. The interface for the fronthaul control link may be similar to the Uu interface. An access link may be established between the base station and a UE via the RU of the repeater, and may constitute a data pass. The access link may carry analog uplink or downlink signals from or to the UE. The RU of the repeater may act as an analog pass through device in the data path. The access link may be fully controlled by the base station.

In order to realize the LOS MIMO gain, the base station may select one or more suitable LOS MIMO precoders. An optimal precoder may be an SVD based precoder that may be computed based on the full channel knowledge. Accordingly, the SVD based precoder may be associated with a high overhead. Some suboptimal precoders based on limited channel feedback may still provide good performance. One or more aspects may relate to utilizing codebook-based precoders for LOS MIMO communication. A codebook-based precoder may be associated with a low feedback overhead. A precoder that is based on the distance feedback and/or the misalignment feedback may be associated with a higher feedback overhead than the codebook-based precoder. A precoder that is based on partial spatial sounding may be associated with a higher still feedback overhead than the precoder based on the distance feedback and/or the misalignment feedback. A precoder that is based on full spatial sounding may be associated with a higher still feedback overhead than the precoder based on partial spatial sounding.

Codebook-based precoders may be based on limited feedback. In one configuration, a wireless device (e.g., a relay node or a UE) may be associated with no or limited sounding capabilities. In one configuration, the Tx and Rx antenna arrays may be aligned. In one configuration, the base station and/or the wireless device may be associated with misalignment estimation or compensation capability. In one configuration, the transmitter and the receiver may be associated with low relative mobility. In one example, the Rx orientation may be semi-static.

In one aspect, the base station may select a codebook for codebook-based precoders for LOS MIMO communication. In one configuration, the base station may select between codebook-based precoders and reciprocity-based or closed-loop precoders based on one or more of an estimated k-factor (e.g., the component percentage of the LOS component in the MIMO channel matrix), a configuration of Tx or Rx antenna arrays, a relative mobility between the transmitter and the receiver, or sounding capabilities of the wireless device (e.g., the relay node or the UE).

In particular, in one configuration, the base station may select codebook-based precoders (and not reciprocity-based or closed-loop precoders) when the MIMO channel includes an LOS component that is associated with a component percentage that is greater than a threshold (e.g., the LOS component may make up more than 99% of the channel). In one configuration, the base station may select codebook-based precoders (and not reciprocity-based or closed-loop precoders) when the distance between the transmitter and the receiver is below a threshold. In one configuration, the base station may select codebook-based precoders (and not reciprocity-based or closed-loop precoders) when the transmitter and the receiver are associated with low relative mobility. In one configuration, the base station may select codebook-based precoders (and not reciprocity-based or closed-loop precoders) when the Tx and Rx antenna arrays are aligned, or misalignment between Tx and Rx antenna arrays can be compensated. In one configuration, the base station may select codebook-based precoders (and not reciprocity-based or closed-loop precoders) when the wireless device (e.g., the relay node or the UE) is associated with no or limited sounding capabilities. In one configuration, the base station may still select reciprocity-based or closed-loop precoders even when the wireless device is associated with no or limited sounding capabilities. In one configuration, the base station may select reciprocity-based or closed-loop precoders when the configuration of Tx or Rx antenna arrays does not support codebook-based precoders. In one configuration, the base station may select codebook-based precoders based on the configuration of Tx or Rx antenna arrays. In particular, the base station may select codebook-based precoders based on a polarization and/or a type (e.g., ID ULA, 2D ULA, uniform circular array (UCA), etc.) of the Tx or Rx antenna arrays.

In one configuration, both Tx and Rx antenna arrays may be ID ULAs, and the base station may select at least one of a Legendre polynomial based precoder (or "Legendre precoders" for short), a block-DFT precoder, a block-Walsh precoder, or a block-Legendre precoder for LOS MIMO communication between the base station and the wireless device.

In one configuration, both Tx and Rx antenna arrays may be 2D ULAs, and the base station may select at least one of a Kronecker Legendre precoder, a Kronecker block-DFT precoder, or a Kronecker block-Walsh precoder for LOS MIMO communication between the base station and the wireless device.

In one configuration, both Tx and Rx antenna arrays may be co-centric UCAs, and the base station may select a block-DFT precoder for LOS MIMO communication between the base station and the wireless device.

A DFT precoder may be a special case of a block-DFT precoder. A Walsh precoder may be a special case of a block-Walsh precoder.

In one configuration, both Tx and Rx antenna arrays may be ID ULAs. The configuration may be denoted as $N_r \times N_t$, where $N_r$ may be the number of antennas or antenna elements in the Rx ULA, and $N_t$ may be the number of antennas or antenna elements in the Tx ULA. In one configuration, $N_t \geq N_r$, and the base station may select a Legendre precoder for LOS MIMO communication. In one configuration, $N_t < N_r$, and the base station may select a block-DFT precoder for LOS MIMO communication.

In one configuration, both Tx and Rx antenna arrays may be 2D ULAs. Each axis (x-axis or y-axis) of a 2D ULA may be considered as a 1D array. Further, a 2D ULA may be considered as a Kronecker product of the two 1D arrays corresponding to the two axes. A Tx 2D ULA may be denoted as $N_{Tx} \times N_{Ty}$, where $N_{Tx}$ may be the number of antennas or antenna elements along the x-axis in the Tx 2D ULA, and $N_{Ty}$ may be the number of antennas or antenna elements along the y-axis in the Tx 2D ULA. Similarly, a Rx 2D ULA may be denoted as $N_{Rx} \times N_{Ry}$, where $N_{Rx}$ may be the number of antennas or antenna elements along the x-axis in the Rx 2D ULA, and $N_{Ry}$ may be the number of antennas or antenna elements along the y-axis in the Rx 2D ULA.

In one aspect, a 2D precoder for 2D ULAs may be computed as the Kronecker product of $V_x$ and $V_y$, where $V_x$ may be the ID precoder for the $N_{Rx} \times N_{Tx}$ channel, and $V_y$ may be the 1D precoder for the $N_{Ry} \times N_{Ty}$ channel.

In one configuration, both Tx and Rx antenna arrays may be 1D ULAs. The Tx and Rx antenna arrays may be symmetric: Tx and Rx antenna arrays may each include N antennas or antenna arrays. The base station may select a Legendre precoder, which may achieve satisfactory performance for a small N. For a moderate N, performance associated with a DFT precoder may be close to that associated with a Legendre precoder.

In one configuration, both Tx and Rx antenna arrays may be ID ULAs. The Tx and Rx antenna arrays may be asymmetric. The antenna configuration may be $N_r \times N_t$. If $N_t < N_r$, a Legendre precoder may achieve highly satisfactory performance. The performance gap between the Legendre precoder and the optimal precoder (e.g., the SVD-based precoder) may be small. If $N_t > N_r$, a block-DFT precoder may achieve satisfactory performance. The performance may be close to that of the optimal precoder when the distance between Tx and Rx antenna arrays are within an optimal range.

In one configuration, both Tx and Rx antenna arrays may be 2D ULAs. The Tx and Rx antenna arrays may be symmetric. For example, Tx and Rx antenna arrays may each be an 8×8 antenna array. When the distance between antenna elements in the Tx and Rx antenna arrays is 5λ, all three Kronecker precoders (i.e., the Kronecker Legendre precoder, the Kronecker block-DFT precoder, or the Kronecker block-Walsh precoder) may achieve reasonably good performance.

In one configuration, both Tx and Rx antenna arrays may be 2D ULAs. The Tx and Rx antenna arrays may be asymmetric. For example, the Tx antenna array may be a 4×4 antenna array, and the Rx antenna array may be an 8×8 antenna array (i.e., $N_t < N_r$). When the distance between antenna elements in the Tx and Rx antenna arrays is 5λ, a Legendre precoder may achieve highly satisfactory performance that may be close to the channel capacity.

In one configuration, both Tx and Rx antenna arrays may be 2D ULAs. The Tx and Rx antenna arrays may be asymmetric. For example, the Tx antenna array may be an 8×8 antenna array, and the Rx antenna array may be a 4×4 antenna array (i.e., $N_t > N_r$). When the distance between antenna elements in the Tx and Rx antenna arrays is 5λ, a 2D block-DFT precoder may achieve satisfactory performance.

In one aspect, in order for the base station to select the most suitable precoders for both the downlink and the uplink, the wireless device (e.g., the relay node or the UE) may indicate to the base station the capabilities of the wireless device related to the LOS MIMO operation. In particular, the wireless device may indicate to the base station one or more of support for LOS MIMO communication, an antenna configuration, an antenna panel configuration, an antenna array geometry (e.g., 1D ULA, 2D ULA, UCA, etc.), the number of antennas or antenna elements, the number of antenna panels, an antenna element distance matrix, an antenna polarization mode (e.g., single polarized or cross polarized), an antenna polarization mapping (e.g., H, V), a sounding capability, a sounding capability associated with LOS MIMO communication (e.g., the ability to sound corner antennas), or an antenna alignment capability (e.g., the ability to estimate and/or compensate for antenna misalignment).

In one aspect, the wireless device (e.g., the relay node or the UE) may disable a subset of antennas or antenna elements, so that the base station may account for adaptive receiver diversity (ARD). In one configuration, the wireless device may transmit, to the base station, a UE-assisted information (UAI) message via layer 3 (L3) signaling to assist the base station in selecting the LOS MIMO precoder. The UAI message may include an indication of the number of active antennas or antenna elements at the wireless device.

In one aspect, the base station may transmit, to the wireless device (e.g., the relay node or the UE), an indication of a codebook-based precoder for uplink LOS MIMO transmission. In different configurations, the base station may transmit the indication of a codebook-based precoder for the uplink to the wireless device via one of an RRC configuration message, a downlink MAC-control element (CE) (MAC-CE), or a DCI message. The use of the RRC configuration message may be based on capabilities of the wireless device. The DL MAC-CE may adapt for ARD. If a DCI message is used for the indication of the precoder for the uplink transmission, the uplink grant may include a TPMI_LOS (TPMI may stand for transmitted precoding matrix indicator) field to indicate the selected precoder in the codebook. In one configuration, the base station may dynamically activate or deactivate the LOS MIMO mode.

Methods for computing the codebook-based precoders described herein are explained in detail below.

A block DFT precoder may be computed as:

$$V_{blk\_dft} = \frac{1}{\sqrt{N_t}} \begin{bmatrix} DFT_{N_r \times N_r} & 0 \\ \vdots & 0 \\ DFT_{N_r \times N_r} & 0 \end{bmatrix},$$

where the N×N DFT matrix may be computed as:

$$\begin{bmatrix} 1 & 1 & 1 & \ldots & 1 \\ 1 & e^{-j2\pi/N} & e^{-j4\pi/N} & \ldots & e^{-j2\pi(N-1)/N} \\ 1 & e^{-j4\pi/N} & e^{-j8\pi/N} & \ldots & e^{-j2\pi 2(N-1)/N} \\ \vdots & \vdots & \vdots & \ddots & \vdots \\ 1 & e^{-j2\pi(N-1)/N} & e^{-j2\pi 2(N-1)/N} & \ldots & e^{-j2\pi(N-1)(N-1)/N} \end{bmatrix}.$$

A block Walsh precoder may be computed as:

$$V_{blk\_walsh} = \frac{1}{\sqrt{N_t}} \begin{bmatrix} W_{N_r \times N_r} & 0 \\ \vdots & 0 \\ W_{N_r \times N_r} & 0 \end{bmatrix},$$

where the N×N Walsh matrix may be defined recursively:

$$W_{2 \times 2} = \begin{bmatrix} 1 & 1 \\ 1 & -1 \end{bmatrix},$$

and $$W_{N \times N} = \begin{bmatrix} W_{N/2,N/2} & W_{N/2,N/2} \\ W_{N/2,N/2} & -W_{N/2,N/2} \end{bmatrix}.$$

A lock Legendre precoder may be computed as:

$$V_{blk\_Legendre} = \frac{1}{\sqrt{N_t}} \begin{bmatrix} P_{N_r \times N_r} & 0 \\ \vdots & 0 \\ P_{N_r \times N_r} & 0 \end{bmatrix}.$$

Methods for computing the matrix P are explained in further detail below.

The Legendre polynomial of the degree $$n = 0, 1, 2, 3 \ldots : P_n(x) = \frac{1}{2^n n!} \frac{d^n}{dx^n}(x^2 - 1)^n,$$

may be first computed at $x \in [-1\ 1]$.

To compute a Legendre precoder for a 1D ULA, for N Tx antennas or antenna elements, $$P_n\left(\frac{2(k-1)}{2(N-1)} - 1\right)$$

for $$n = 0, \ldots,$$

N−1 and k=1, . . . , N may be computed. That is, the interval [−1,1] may be divided into N equally separated points, and the Legendre polynomial may be computed at each point (row index k) to form the vector:

$$p_n = \begin{bmatrix} P_n(-1) \\ \vdots \\ P_n(1) \end{bmatrix}.$$

The matrix may be orthogonalized with QR decomposition, and then normalized as follows:

$$p_n = p_n \Big/ \sqrt{(p_n)^H * p_n}.$$

The Legendre precoder may then be constructed: P=[$p_0$ $p_1$ $p_2$ . . . $p_{N-1}$]. Legendre polynomials may be orthogonal if sampled with a high enough sampling rate. However, for a limited set of samples, the output matrix may not be orthogonal. Accordingly, the orthogonalization step may be performed because finite samples are used.

The 1D Legendre precoder may be computed based on an alternative method. If the sampling approach can be improved, for example, x=linespace (−1, 1, $N_r$), a closed-form expression for constructing orthogonal polynomials from finite samples may be found. That is, the definition of Legendre polynomials may be changed for a given $N_r$. Polynomial coefficients may be changed to ensure orthogonality with finite samples. For example, a codebook may be defined based on Legendre polynomials. Codewords may be defined for a given antenna array configuration (e.g., N1, N2) of a wireless device, where N1 may be the number of antennas or antenna elements in the x-axis, and N2 may be the number of antennas or antenna elements in the y-axis.

The Legendre precoder may be extended to 2D. A 2D ULA may be considered as a Kronecker product of two 1D arrays, where each axis (x-axis or y-axis) may be considered as a 1D array. Accordingly, the 1D precoder for each axis ($N_{Tx} \times N_{Rx}$ for x-axis and $N_{Ty} \times N_{Ry}$ for y-axis) may be constructed first. The 2D precoder may then be the Kronecker product of the two 1D precoders. In other words, a 2D Kronecker precoder (e.g., a Kronecker Legendre precoder, a Kronecker block-DFT precoder, or a Kronecker DFT precoder) may be computed as:

$$V_{2D} = V_{N_{Tx} \times N_{Rx}} \otimes V_{N_{Ty} \times N_{Ry}},$$

where $\otimes$ may be the Kronecker product operator, $V_{N_{Tx} \times N_{Rx}}$ may be the precoder for the 1D array in the x-axis, and $V_{N_{Ty} \times N_{Ry}}$ may be the precoder for the 1D array in the y-axis.

In one configuration, a Legendre precoder for a 2D ULA may be computed as follows. A precoder 3D matrix may be constructed, where each mode may correspond to an $N_x \times N_y$ matrix. The modes may be ordered: (i, j) for i=0, 1, . . . , $N_x$−1 and j=0, 1, . . . , $N_y$−1. To obtain the precoder for the mode (i, j), referred to as $P_{ij}$, if i=j, $P_{ii}=p_i*p_i'$ may be computed and then normalized; if i<j, $P_{ij}=p_i*p_j'+p_j*p_i'$ and $P_{ji}=p_i*p_j'-p_j*p_i'$ may be computed and then normalized.

Figure 6:
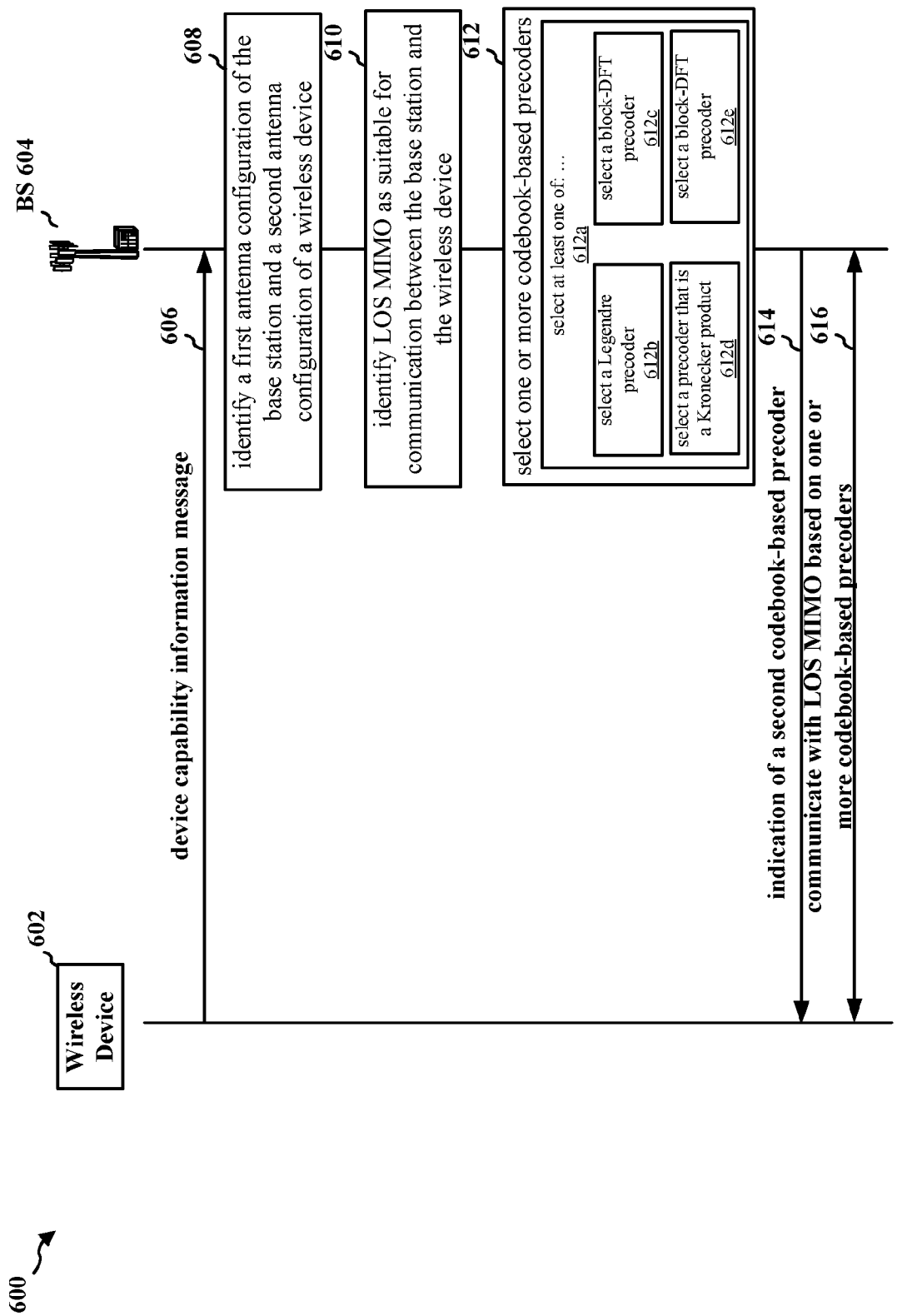
FIG. 6 is a diagram of a communication flow of a method of wireless communication.

FIG. 6 is a diagram of a communication flow 600 of a method of wireless communication. The wireless device 602 may correspond to UE 104/350/506a, or may correspond to a relay node 504. A relay node may be an IAB node, a repeater, or a CPE, etc. The base station 604 may correspond to the base station 102/180/310/502. At 606, the wireless device 602 may transmit, to the base station 604, and the base station 604 may receive, from the wireless device 602, a device capability information message. The device capability information message may include one or more indications of at least one of: LOS MIMO support, an antenna configuration, an antenna activation status, a panel configuration, an antenna geometry, a number of antennas, a number of panels, an antenna element distance matrix, antenna polarization information, a sounding capability, or an antenna alignment capability. The device capability information message may be transmitted and received via a UAI message. At 608, the base station 604 may identify a first antenna configuration of the base station 604 and a second antenna configuration of a wireless device 602. At 610, the base station 604 may identify LOS MIMO as suitable for communication between the base station 604 and the wireless device 602 based on at least one of a channel condition, a mobility scenario between the base station 604 and the wireless device 602, a distance between the base station 604 and the wireless device 602, an antenna alignment condition, an antenna configuration, or a sounding capability.

At 612, the base station 604 may select one or more codebook-based precoders for communication with the wireless device 602 with LOS MIMO. The one or more codebook-based precoders may include a first codebook-based precoder for transmission from the base station to the wireless device and a second codebook-based precoder for transmission from the wireless device to the base station. At 612a, the base station 604 may select at least one of a Legendre precoder, a block-DFT precoder, a DFT precoder, a block-Walsh precoder, a Walsh precoder, a block-Legendre precoder, a Kronecker Legendre precoder, a Kronecker block-DFT precoder, or a Kronecker block-Walsh precoder. At 612b, the base station 604 may select a Legendre precoder when both the base station 604 and the wireless device 602 are associated with ID ULA antennas and a receiving device between the base station 604 and the wireless device 602 is associated with more antenna elements than a transmitting device between the base station 604 and the wireless device 602, or is associated with an equal number of antenna elements as the transmitting device. At 612c, the base station 604 may select a block-DFT precoder when both the base station 604 and the wireless device 602 are associated with ID ULA antennas and a receiving device between the base station 604 and the wireless device 602 is associated with fewer antenna elements than a transmitting device between the base station 604 and the wireless device 602. At 612d, the base station 604 may select a precoder that is a Kronecker product of two 1D precoders when both the base station 604 and the wireless device 602 are associated with 2D ULA antennas each including two axes. Each of the two ID precoders may correspond to one of the two axes of the 2D ULA antennas. For each axis, the corresponding 1D precoder may be a Legendre precoder when a number of receiving antenna elements is greater than or equal to a number of transmitting antenna elements along the axis, and the corresponding ID precoder may be a block-DFT precoder when the number of the receiving antenna elements is less than the number of the transmitting antenna elements along the axis. At 612e, the base station 604 may select a block-DFT precoder when both the base station 604 and the wireless device 602 are associated with UCA antennas.

At 614, the base station 604 may transmit, to the wireless device 602, and the wireless device 602 may receive, from the base station 604, an indication of a second codebook-based precoder for transmission from the wireless device 602 to the base station 604 with LOS MIMO. The indication of a second codebook-based precoder may be transmitted and received via one of an RRC configuration message, a downlink MAC-CE, or a DCI message. At 616, the wireless device 602 and the base station 604 may communicate with each other with LOS MIMO based on the one or more codebook-based precoders.

Figure 7:
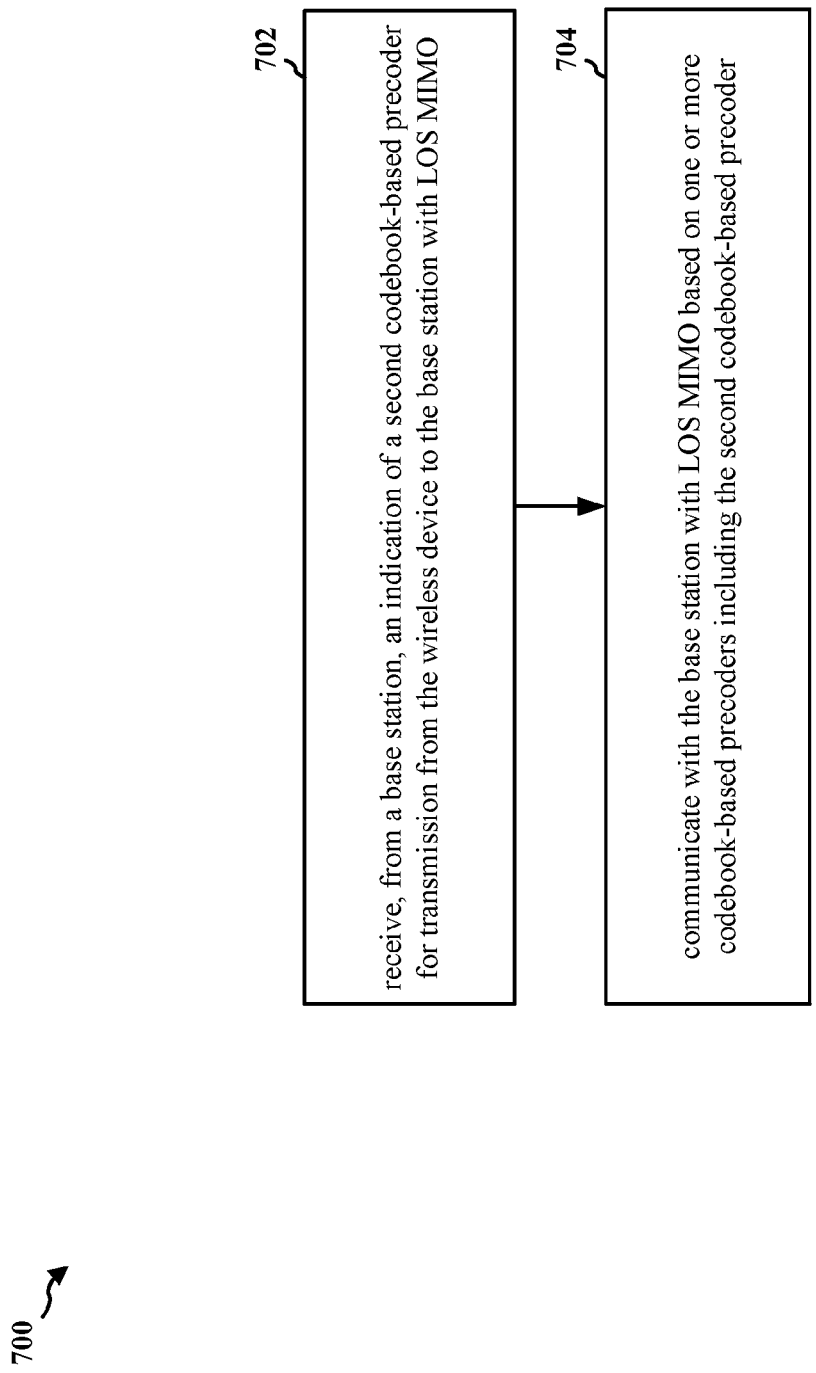
FIG. 7 is a flowchart of a method of wireless communication.

FIG. 7 is a flowchart 700 of a method of wireless communication. The method may be performed by a wireless device (e.g., the UE 104/350; the wireless device 602; the apparatus 1102). At 702, the wireless device may receive, from a base station, an indication of a second codebook-based precoder for transmission from the wireless device to the base station with LOS MIMO. For example, 702 may be performed by the codebook component 1140 in FIG. 11. Referring to FIG. 6, at 614, the wireless device 602 may receive, from a base station 604, an indication of a second codebook-based precoder for transmission from the wireless device 602 to the base station 604 with LOS MIMO.

At 704, the wireless device may communicate with the base station with LOS MIMO based on one or more codebook-based precoders including the second codebook-based precoder. For example, 704 may be performed by the codebook component 1140 in FIG. 11. Referring to FIG. 6, at 616, the wireless device 602 may communicate with the base station 604 with LOS MIMO based on one or more codebook-based precoders including the second codebook-based precoder.

Figure 8:
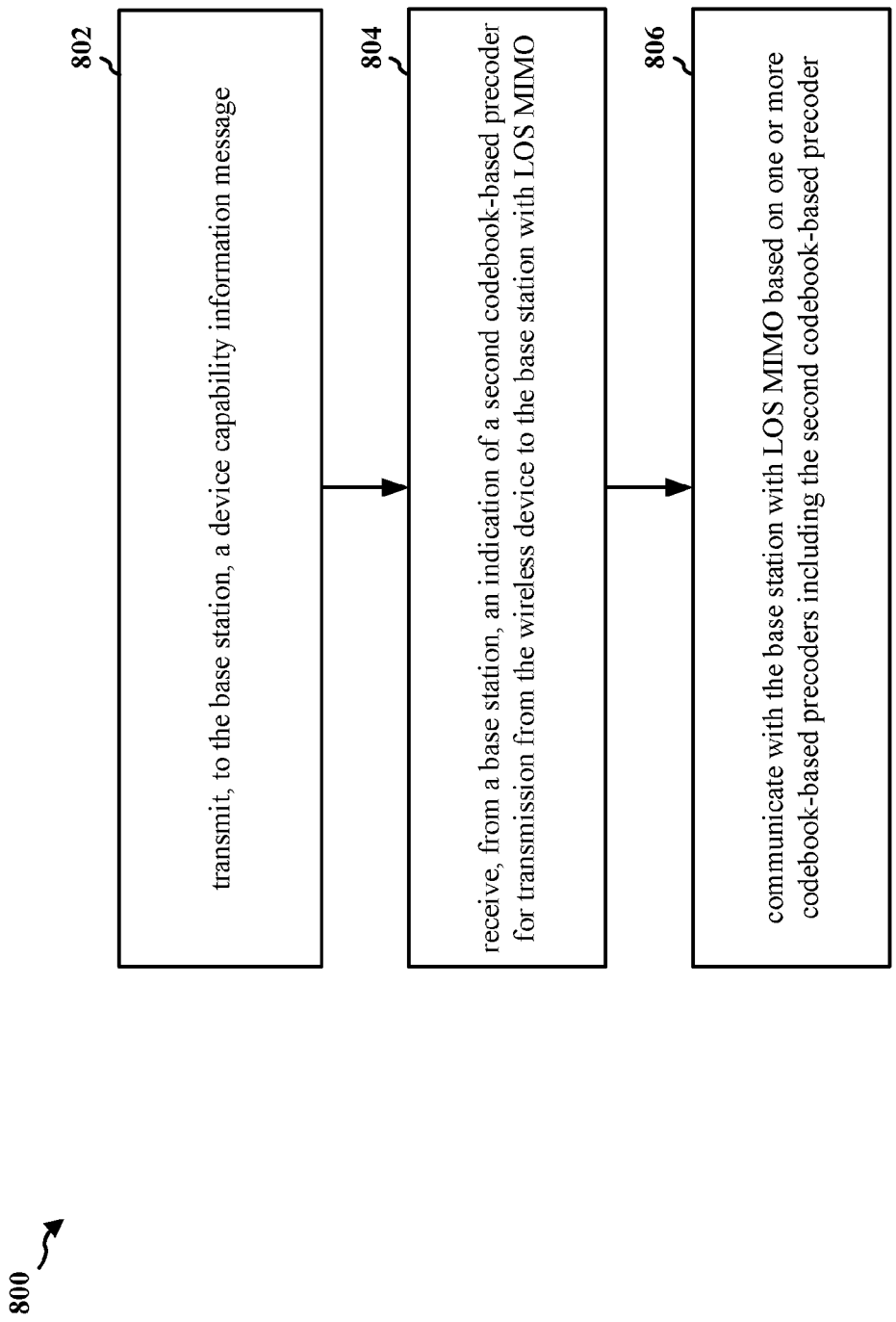
FIG. 8 is a flowchart of a method of wireless communication.

FIG. 8 is a flowchart 800 of a method of wireless communication. The method may be performed by a wireless device (e.g., the UE 104/350; the wireless device 602; the apparatus 1102). At 804, the wireless device may receive, from a base station, an indication of a second codebook-based precoder for transmission from the wireless device to the base station with LOS MIMO. For example, 804 may be performed by the codebook component 1140 in FIG. 11. Referring to FIG. 6, at 614, the wireless device 602 may receive, from a base station 604, an indication of a second codebook-based precoder for transmission from the wireless device 602 to the base station 604 with LOS MIMO.

At 806, the wireless device may communicate with the base station with LOS MIMO based on one or more codebook-based precoders including the second codebook-based precoder. For example, 806 may be performed by the codebook component 1140 in FIG. 11. Referring to FIG. 6, at 616, the wireless device 602 may communicate with the base station 604 with LOS MIMO based on one or more codebook-based precoders including the second codebook-based precoder.

In one configuration, at 802, the wireless device may transmit, to the base station, a device capability information message. The device capability information message may include one or more indications of at least one of LOS MIMO support, an antenna configuration, an antenna activation status, a panel configuration, an antenna geometry, a number of antennas, a number of panels, an antenna element distance matrix, antenna polarization information, a sounding capability, or an antenna alignment capability. For example, 802 may be performed by the codebook component 1140 in FIG. 11. Referring to FIG. 6, at 606, the wireless device 602 may transmit, to the base station 604, a device capability information message.

In one configuration, the device capability information message may be transmitted to the base station via a UAI message.

In one configuration, the one or more codebook-based precoders may further include a first codebook-based precoder for transmission from the base station to the wireless device.

In one configuration, the indication of the second codebook-based precoder may be received from the base station via one of an RRC configuration message, a downlink MAC-CE, or a DCI message.

In one configuration, the codebook-based precoder used may include at least one of a Legendre precoder, a block-DFT precoder, a block-Walsh precoder, a block-Legendre precoder, a Kronecker Legendre precoder, a Kronecker block-DFT precoder, or a Kronecker block-Walsh precoder.

In one configuration, a Legendre precoder may be used when both the base station and the wireless device are associated with 1D ULA antennas and a receiving device between the base station and the wireless device is associated with more antenna elements than a transmitting device between the base station and the wireless device, or is associated with an equal number of antenna elements as the transmitting device.

In one configuration, a block-DFT precoder may be used when both the base station and the wireless device are associated with 1D ULA antennas and a receiving device between the base station and the wireless device is associated with fewer antenna elements than a transmitting device between the base station and the wireless device.

In one configuration, a precoder that is a Kronecker product of two 1D precoders may be used when both the base station and the wireless device are associated with 2D ULA antennas each including two axes. Each of the two 1D precoders may correspond to one of the two axes of the 2D ULA antennas.

In one configuration, for each axis, the corresponding 1D precoder may be a Legendre precoder when a number of receiving antenna elements is greater than or equal to a number of transmitting antenna elements, and the corresponding 1D precoder may be a block-DFT precoder when the number of the receiving antenna elements is less than the number of the transmitting antenna elements along the axis.

In one configuration, a block-DFT precoder may be used when both the base station and the wireless device are associated with UCA antennas.

In one configuration, the wireless device may include one of a UE, an IAB node, a repeater, or a CPE.

Figure 9:
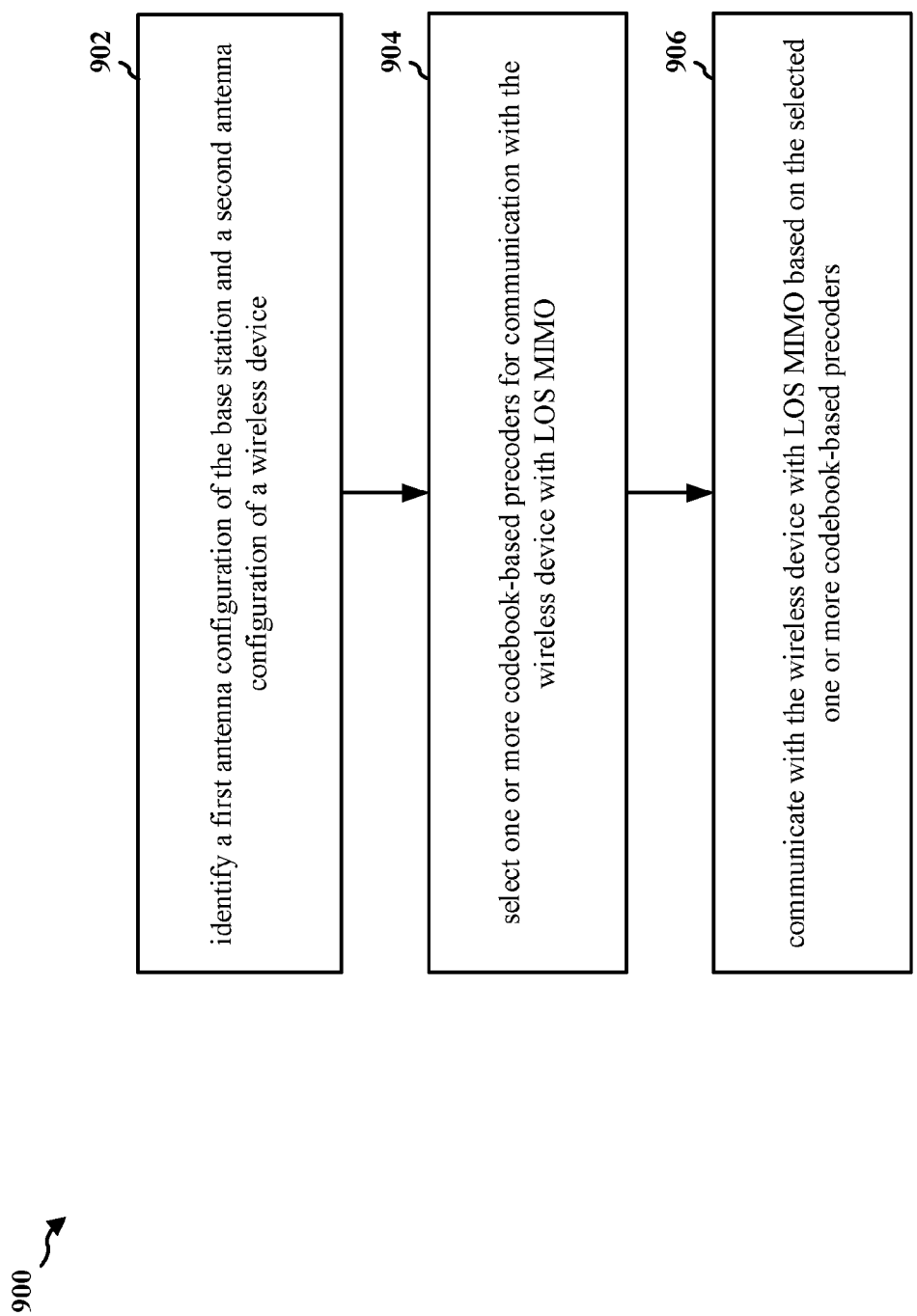
FIG. 9 is a flowchart of a method of wireless communication.

FIG. 9 is a flowchart 900 of a method of wireless communication. The method may be performed by a base station (e.g., the base station 102/180/310/502/604; the apparatus 1202). At 902, the base station may identify a first antenna configuration of the base station and a second antenna configuration of a wireless device. For example, 902 may be performed by the codebook component 1240 in FIG. 12. Referring to FIG. 6, at 608, the base station 604 may identify a first antenna configuration of the base station 604 and a second antenna configuration of a wireless device 602.

At 904, the base station may select one or more codebook-based precoders for communication with the wireless device with LOS MIMO. For example, 904 may be performed by the codebook component 1240 in FIG. 12. Referring to FIG. 6, at 612, the base station 604 may select one or more codebook-based precoders for communication with the wireless device 602 with LOS MIMO.

At 906, the base station may communicate with the wireless device with LOS MIMO based on the selected one or more codebook-based precoders. For example, 906 may be performed by the codebook component 1240 in FIG. 12. Referring to FIG. 6, at 616, the base station 604 may communicate with the wireless device 602 with LOS MIMO based on the selected one or more codebook-based precoders.

Figure 10:
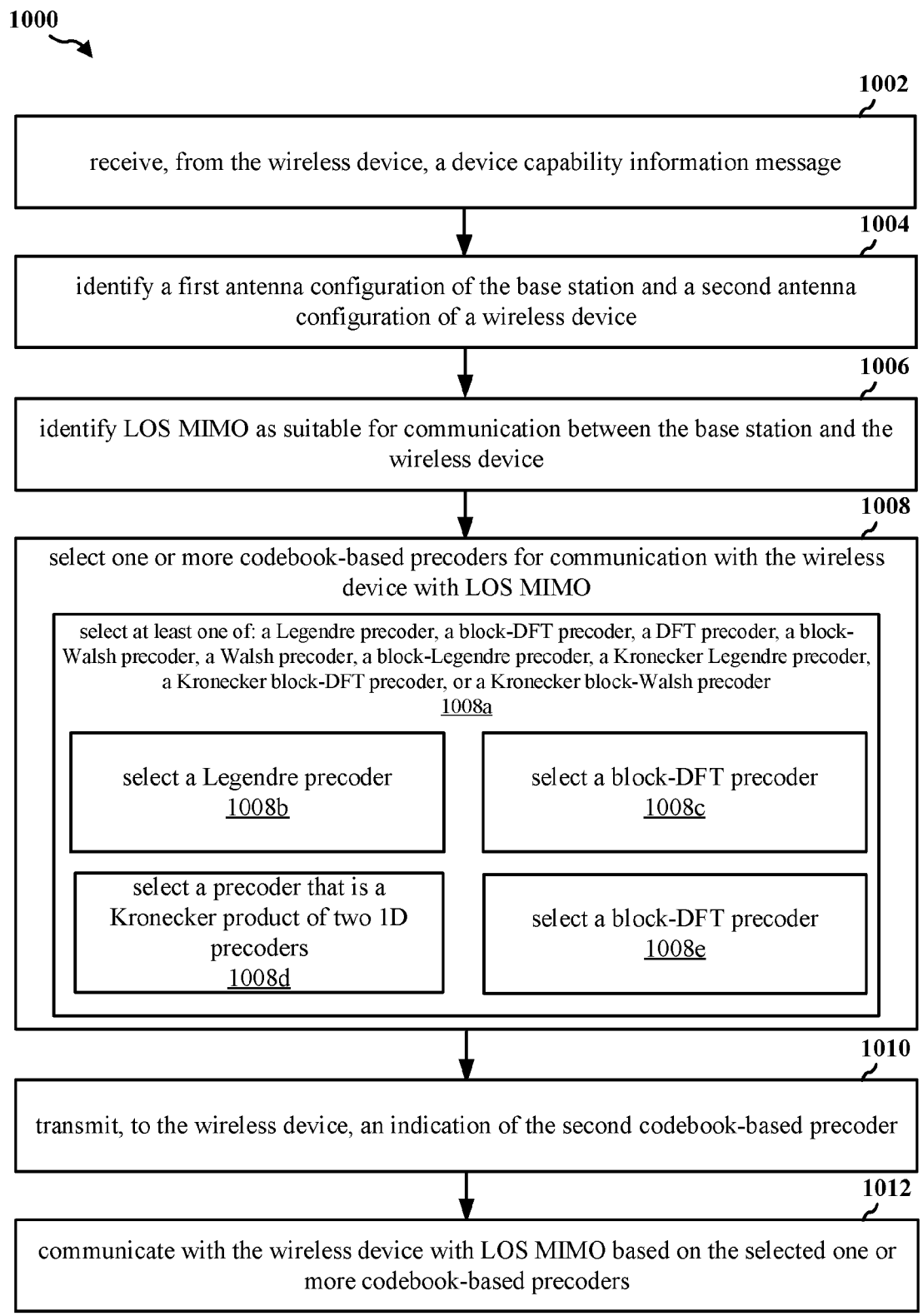
FIG. 10 is a flowchart of a method of wireless communication.

FIG. 10 is a flowchart 1000 of a method of wireless communication. The method may be performed by a base station (e.g., the base station 102/180/310/604; the apparatus 1202). At 1004, the base station may identify a first antenna configuration of the base station and a second antenna configuration of a wireless device. For example, 1004 may be performed by the codebook component 1240 in FIG. 12. Referring to FIG. 6, at 608, the base station 604 may identify a first antenna configuration of the base station 604 and a second antenna configuration of a wireless device 602.

At 1008, the base station may select one or more codebook-based precoders for communication with the wireless device with LOS MIMO. For example, 1008 may be performed by the codebook component 1240 in FIG. 12. Referring to FIG. 6, at 612, the base station 604 may select one or more codebook-based precoders for communication with the wireless device 602 with LOS MIMO.

At 1012, the base station may communicate with the wireless device with LOS MIMO based on the selected one or more codebook-based precoders. For example, 1012 may be performed by the codebook component 1240 in FIG. 12. Referring to FIG. 6, at 616, the base station 604 may communicate with the wireless device 602 with LOS MIMO based on the selected one or more codebook-based precoders.

In one configuration, at 1002, the base station may receive, from the wireless device, a device capability information message. The device capability information message may include one or more indications of at least one of LOS MIMO support, an antenna configuration, an antenna activation status, a panel configuration, an antenna geometry, a number of antennas, a number of panels, an antenna element distance matrix, antenna polarization information, a sounding capability, or an antenna alignment capability. For example, 1002 may be performed by the codebook component 1240 in FIG. 12. Referring to FIG. 6, at 606, the base station 604 may receive, from the wireless device 602, a device capability information message.

In one configuration, the device capability information message may be received from the wireless device via a UAI message.

In one configuration, the one or more codebook-based precoders may include a first codebook-based precoder for transmission from the base station to the wireless device and a second codebook-based precoder for transmission from the wireless device to the base station.

In one configuration, at 1010, the base station may transmit, to the wireless device, an indication of the second codebook-based precoder. For example, 1010 may be performed by the codebook component 1240 in FIG. 12. Referring to FIG. 6, at 614, the base station 604 may transmit, to the wireless device 602, an indication of the second codebook-based precoder.

In one configuration, the indication of the second codebook-based precoder may be transmitted to the wireless device via one of an RRC configuration message, a downlink MAC-CE, or a DCI message.

In one configuration, at 1006, the base station may identify LOS MIMO as suitable for communication between the base station and the wireless device based on at least one of a channel condition, a mobility scenario between the base station and the wireless device, a distance between the base station and the wireless device, an antenna alignment condition, an antenna configuration, or a sounding capability. For example, 1006 may be performed by the codebook component 1240 in FIG. 12. Referring to FIG. 6, at 610, the base station 604 may identify LOS MIMO as suitable for communication between the base station 604 and the wireless device 602 based on at least one of a channel condition, a mobility scenario between the base station 604 and the wireless device 602, a distance between the base station 604 and the wireless device 602, an antenna alignment condition, an antenna configuration, or a sounding capability.

In one configuration, at 1008a, the base station may select at least one of a Legendre precoder, a block-DFT precoder, a DFT precoder, a block-Walsh precoder, a Walsh precoder, a block-Legendre precoder, a Kronecker Legendre precoder, a Kronecker block-DFT precoder, or a Kronecker block-Walsh precoder. For example, 1008a may be performed by the codebook component 1240 in FIG. 12. Referring to FIG. 6, at 612a, the base station 604 may select at least one of a Legendre precoder, a block-DFT precoder, a DFT precoder, a block-Walsh precoder, a Walsh precoder, a block-Legendre precoder, a Kronecker Legendre precoder, a Kronecker block-DFT precoder, or a Kronecker block-Walsh precoder.

In one configuration, at 1008b, the base station may select a Legendre precoder when both the base station and the wireless device are associated with ID ULA antennas and a receiving device between the base station and the wireless device is associated with more antenna elements than a transmitting device between the base station and the wireless device, or is associated with an equal number of antenna elements as the transmitting device. For example, 1008b may be performed by the codebook component 1240 in FIG. 12. Referring to FIG. 6, at 612b, the base station 604 may select a Legendre precoder when both the base station 604 and the wireless device 602 are associated with 1D ULA antennas and a receiving device between the base station 604 and the wireless device 602 is associated with more antenna elements than a transmitting device between the base station 604 and the wireless device 602, or is associated with an equal number of antenna elements as the transmitting device.

In one configuration, at 1008c, the base station may select a block-DFT precoder when both the base station and the wireless device are associated with ID ULA antennas and a receiving device between the base station and the wireless device is associated with fewer antenna elements than a transmitting device between the base station and the wireless device. For example, 1008c may be performed by the codebook component 1240 in FIG. 12. Referring to FIG. 6, at 612c, the base station 604 may select a block-DFT precoder when both the base station 604 and the wireless device 602 are associated with ID ULA antennas and a receiving device between the base station 604 and the wireless device 602 is associated with fewer antenna elements than a transmitting device between the base station 604 and the wireless device 602.

In one configuration, at 1008d, the base station may select a precoder that is a Kronecker product of two ID precoders when both the base station and the wireless device are associated with 2D ULA antennas each including two axes. Each of the two ID precoders may correspond to one of the two axes of the 2D ULA antennas. For example, 1008d may be performed by the codebook component 1240 in FIG. 12. Referring to FIG. 6, at 612d, the base station 604 may select a precoder that is a Kronecker product of two ID precoders when both the base station 604 and the wireless device 602 are associated with 2D ULA antennas each including two axes.

In one configuration, for each axis, the corresponding 1D precoder may be a Legendre precoder when a number of receiving antenna elements is greater than or equal to a number of transmitting antenna elements along the axis, and the corresponding 1D precoder may be a block-DFT precoder when the number of the receiving antenna elements is less than the number of the transmitting antenna elements along the axis.

In one configuration, at 1008e, the base station may select a block-DFT precoder when both the base station and the wireless device are associated with UCA antennas. For example, 1008e may be performed by the codebook component 1240 in FIG. 12. Referring to FIG. 6, at 612e, the base station 604 may select a block-DFT precoder when both the base station 604 and the wireless device 602 are associated with UCA antennas.

Figure 11:
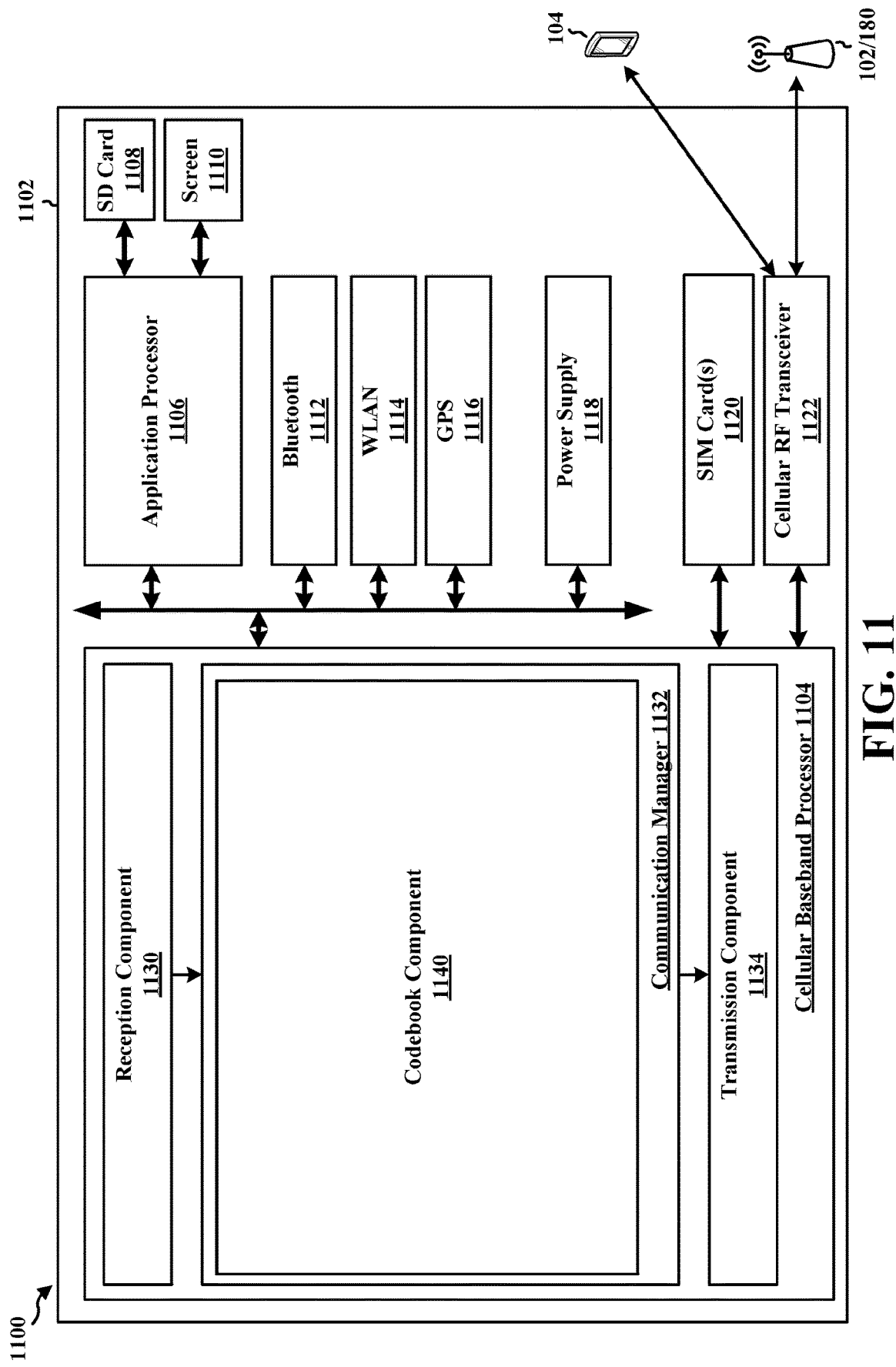
FIG. 11 is a diagram illustrating an example of a hardware implementation for an example apparatus.

FIG. 11 is a diagram 1100 illustrating an example of a hardware implementation for an apparatus 1102. The apparatus 1102 may be a wireless device, a component of a wireless device, or may implement wireless device functionality. In particular, the apparatus 1102 may be a UE, an IAB node, a repeater, or a CPE. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a codebook component 1140 that may be configured to transmit, to the base station, a device capability information message, e.g., as described in connection with 802 in FIG. 8. The codebook component 1140 may be configured to receive, from a base station, an indication of a second codebook-based precoder for transmission from the wireless device to the base station with LOS MIMO, e.g., as described in connection with 702 in FIGS. 7 and 804 in FIG. 8. The codebook component 1140 may be configured to communicate with the base station with LOS MIMO based on one or more codebook-based precoders including the second codebook-based precoder, e.g., as described in connection with 704 in FIGS. 7 and 806 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a base station, an indication of a second codebook-based precoder for transmission from the wireless device to the base station with LOS MIMO. The apparatus 1102 may include means for communicating with the base station with LOS MIMO based on one or more codebook-based precoders including the second codebook-based precoder.

In one configuration, the apparatus 1102 may include means for transmitting, to the base station, a device capability information message. The device capability information message may include one or more indications of at least one of LOS MIMO support, an antenna configuration, an antenna activation status, a panel configuration, an antenna geometry, a number of antennas, a number of panels, an antenna element distance matrix, antenna polarization information, a sounding capability, or an antenna alignment capability. In one configuration, the device capability information message may be transmitted to the base station via a UAI message. In one configuration, the one or more codebook-based precoders may further include a first codebook-based precoder for transmission from the base station to the wireless device. In one configuration, the indication of the second codebook-based precoder may be received from the base station via one of an RRC configuration message, a downlink MAC-CE, or a DCI message. In one configuration, the codebook-based precoder used may include at least one of a Legendre precoder, a block-DFT precoder, a block-Walsh precoder, a block-Legendre precoder, a Kronecker Legendre precoder, a Kronecker block-DFT precoder, or a Kronecker block-Walsh precoder. In one configuration, a Legendre precoder may be used when both the base station and the wireless device are associated with ID ULA antennas and a receiving device between the base station and the wireless device is associated with more antenna elements than a transmitting device between the base station and the wireless device, or is associated with an equal number of antenna elements as the transmitting device. In one configuration, a block-DFT precoder may be used when both the base station and the wireless device are associated with ID ULA antennas and a receiving device between the base station and the wireless device is associated with fewer antenna elements than a transmitting device between the base station and the wireless device. In one configuration, a precoder that is a Kronecker product of two 1D precoders may be used when both the base station and the wireless device are associated with 2D ULA antennas each including two axes. Each of the two ID precoders may correspond to one of the two axes of the 2D ULA antennas. In one configuration, for each axis, the corresponding ID precoder may be a Legendre precoder when a number of receiving antenna elements is greater than or equal to a number of transmitting antenna elements, and the corresponding 1D precoder may be a block-DFT precoder when the number of the receiving antenna elements is less than the number of the transmitting antenna elements along the axis. In one configuration, a block-DFT precoder may be used when both the base station and the wireless device are associated with UCA antennas. In one configuration, the wireless device may include one of a UE, an IAB node, a repeater, or a CPE.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
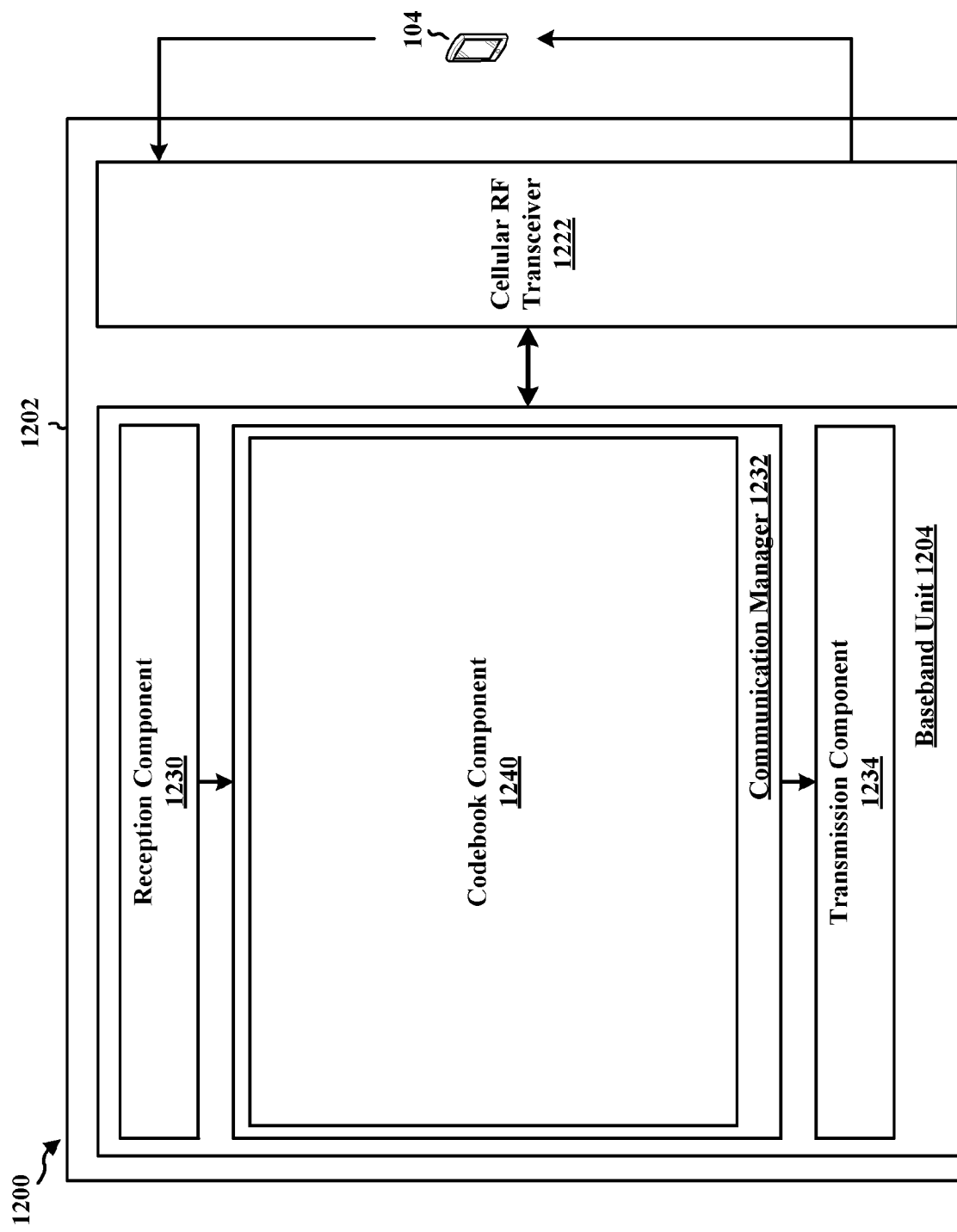
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a codebook component 1240 that may be configured to receive, from the wireless device, a device capability information message, e.g., as described in connection with 902 in FIGS. 9 and 1002 in FIG. 10. The codebook component 1240 may be configured to identify a first antenna configuration of the base station and a second antenna configuration of a wireless device, e.g., as described in connection with 1004 in FIG. 10. The codebook component 1240 may be configured to identify LOS MIMO as suitable for communication between the base station and the wireless device based on at least one of a channel condition, a mobility scenario between the base station and the wireless device, a distance between the base station and the wireless device, an antenna alignment condition, an antenna configuration, or a sounding capability, e.g., as described in connection with 1006 in FIG. 10. The codebook component 1240 may be configured to select one or more codebook-based precoders for communication with the wireless device with LOS MIMO, e.g., as described in connection with 904 in FIGS. 9 and 1008 in FIG. 10. The codebook component 1240 may be configured to select at least one of a Legendre precoder, a block-DFT precoder, a DFT precoder, a block-Walsh precoder, a Walsh precoder, a block-Legendre precoder, a Kronecker Legendre precoder, a Kronecker block-DFT precoder, or a Kronecker block-Walsh precoder, e.g., as described in connection with 1008a in FIG. 10. The codebook component 1240 may be configured to select a Legendre precoder when both the base station and the wireless device are associated with ID ULA antennas and a receiving device between the base station and the wireless device is associated with more antenna elements than a transmitting device between the base station and the wireless device, or is associated with an equal number of antenna elements as the transmitting device, e.g., as described in connection with 1008b in FIG. 10. The codebook component 1240 may be configured to select a block-DFT precoder when both the base station and the wireless device are associated with 1D ULA antennas and a receiving device between the base station and the wireless device is associated with fewer antenna elements than a transmitting device between the base station and the wireless device, e.g., as described in connection with 1008c in FIG. 10. The codebook component 1240 may be configured to select a precoder that is a Kronecker product of two ID precoders when both the base station and the wireless device are associated with 2D ULA antennas each including two axes, e.g., as described in connection with 1008d in FIG. 10. The codebook component 1240 may be configured to select a block-DFT precoder when both the base station and the wireless device are associated with UCA antennas, e.g., as described in connection with 1008e in FIG. 10. The codebook component 1240 may be configured to transmit, to the wireless device, an indication of the second codebook-based precoder, e.g., as described in connection with 1010 in FIG. 10. The codebook component 1240 may be configured to communicate with the wireless device with LOS MIMO based on the selected one or more codebook-based precoders, e.g., as described in connection with 906 in FIGS. 9 and 1012 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for identifying a first antenna configuration of the base station and a second antenna configuration of a wireless device. The apparatus 1202 may include means for selecting one or more codebook-based precoders for communication with the wireless device with LOS MIMO. The apparatus 1202 may include means for communicating with the wireless device with LOS MIMO based on the selected one or more codebook-based precoders.

In one configuration, the apparatus 1202 may include means for receiving, from the wireless device, a device capability information message. The device capability information message may include one or more indications of at least one of LOS MIMO support, an antenna configuration, an antenna activation status, a panel configuration, an antenna geometry, a number of antennas, a number of panels, an antenna element distance matrix, antenna polarization information, a sounding capability, or an antenna alignment capability. In one configuration, the device capability information message may be received from the wireless device via a UAI message. In one configuration, the one or more codebook-based precoders may include a first codebook-based precoder for transmission from the base station to the wireless device and a second codebook-based precoder for transmission from the wireless device to the base station. In one configuration, the apparatus 1202 may include means for transmitting, to the wireless device, an indication of the second codebook-based precoder. In one configuration, the indication of the second codebook-based precoder may be transmitted to the wireless device via one of an RRC configuration message, a downlink MAC-CE, or a DCI message. In one configuration, the apparatus 1202 may include means for identifying LOS MIMO as suitable for communication between the base station and the wireless device based on at least one of a channel condition, a mobility scenario between the base station and the wireless device, a distance between the base station and the wireless device, an antenna alignment condition, an antenna configuration, or a sounding capability. In one configuration, the apparatus 1202 may include means for selecting at least one of a Legendre precoder, a block-DFT precoder, a DFT precoder, a block-Walsh precoder, a Walsh precoder, a block-Legendre precoder, a Kronecker Legendre precoder, a Kronecker block-DFT precoder, or a Kronecker block-Walsh precoder. In one configuration, the apparatus 1202 may include means for selecting a Legendre precoder when both the base station and the wireless device are associated with 1D ULA antennas and a receiving device between the base station and the wireless device is associated with more antenna elements than a transmitting device between the base station and the wireless device, or is associated with an equal number of antenna elements as the transmitting device. In one configuration, the apparatus 1202 may include means for selecting a block-DFT precoder when both the base station and the wireless device are associated with ID ULA antennas and a receiving device between the base station and the wireless device is associated with fewer antenna elements than a transmitting device between the base station and the wireless device. In one configuration, the apparatus 1202 may include means for selecting a precoder that is a Kronecker product of two 1D precoders when both the base station and the wireless device are associated with 2D ULA antennas each including two axes. Each of the two ID precoders may correspond to one of the two axes of the 2D ULA antennas. In one configuration, for each axis, the corresponding 1D precoder may be a Legendre precoder when a number of receiving antenna elements is greater than or equal to a number of transmitting antenna elements along the axis, and the corresponding 1D precoder may be a block-DFT precoder when the number of the receiving antenna elements is less than the number of the transmitting antenna elements along the axis. In one configuration, the apparatus 1202 may include means for selecting a block-DFT precoder when both the base station and the wireless device are associated with UCA antennas.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Therefore, according to one or more aspects described herein, a base station may identify a first antenna configuration of the base station and a second antenna configuration of a wireless device. The base station may select one or more codebook-based precoders for communication with the wireless device with LOS MIMO. The one or more codebook-based precoders may include at least one of a Legendre precoder, a block-DFT precoder, a DFT precoder, a block-Walsh precoder, a Walsh precoder, a block-Legendre precoder, a Kronecker Legendre precoder, a Kronecker block-DFT precoder, or a Kronecker block-Walsh precoder. The base station may transmit, to a wireless device, an indication of a second codebook-based precoder for transmission from the wireless device to the base station with LOS MIMO. The base station and the wireless device may communicate with each other with LOS MIMO based on one or more codebook-based precoders. Accordingly, the base station may select appropriate codebook-based precoders for LOS MIMO-based communication between the base station and the wireless device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and configured to identify a first antenna configuration of the base station and a second antenna configuration of a wireless device; select one or more codebook-based precoders for communication with the wireless device with LOS MIMO; and communicate with the wireless device with LOS MIMO based on the selected one or more codebook-based precoders.

Aspect 2 is the apparatus of aspect 1, where to identify the second antenna configuration of the wireless device, the at least one processor is further configured to: receive, from the wireless device, a device capability information message, where the device capability information message includes one or more indications of at least one of: LOS MIMO support, an antenna configuration, an antenna activation status, a panel configuration, an antenna geometry, a number of antennas, a number of panels, an antenna element distance matrix, antenna polarization information, a sounding capability, or an antenna alignment capability.

Aspect 3 is the apparatus of aspect 2, where the at least one processor is further configured to receive the device capability information message via a UAI message.

Aspect 4 is the apparatus of any of aspects 1 to 3, where the one or more codebook-based precoders include a first codebook-based precoder for transmission from the base station to the wireless device and a second codebook-based precoder for transmission from the wireless device to the base station.

Aspect 5 is the apparatus of aspect 4, the at least one processor being further configured to: transmit, to the wireless device, an indication of the second codebook-based precoder.

Aspect 6 is the apparatus of aspect 5, where the at least one processor is further configured to transmit the indication of the second codebook-based precoder to the wireless device via one of an RRC configuration message, a downlink MAC-CE, or a DCI message.

Aspect 7 is the apparatus of any of aspects 1 to 6, the at least one processor being further configured to: identify LOS MIMO as suitable for communication between the base station and the wireless device based on at least one of: a channel condition, a mobility scenario between the base station and the wireless device, a distance between the base station and the wireless device, an antenna alignment condition, an antenna configuration, or a sounding capability.

Aspect 8 is the apparatus of any of aspects 1 to 7, where to select the one or more codebook-based precoders, the at least one processor is further configured to: select at least one of: a Legendre precoder, a block-DFT precoder, a DFT precoder, a block-Walsh precoder, a Walsh precoder, a block-Legendre precoder, a Kronecker Legendre precoder, a Kronecker block-DFT precoder, or a Kronecker block-Walsh precoder.

Aspect 9 is the apparatus of any of aspects 1 to 8, where to select the one or more codebook-based precoders, the at least one processor is further configured to: select a Legendre precoder when both the base station and the wireless device are associated with 1D ULA antennas and a receiving device between the base station and the wireless device is associated with more antenna elements than a transmitting device between the base station and the wireless device, or is associated with an equal number of antenna elements as the transmitting device.

Aspect 10 is the apparatus of any of aspects 1 to 8, where to select the one or more codebook-based precoders, the at least one processor is further configured to: select a block-DFT precoder when both the base station and the wireless device are associated with 1D ULA antennas and a receiving device between the base station and the wireless device is associated with fewer antenna elements than a transmitting device between the base station and the wireless device.

Aspect 11 is the apparatus of any of aspects 1 to 8, where to select the one or more codebook-based precoders, the at least one processor is further configured to: select a precoder that is a Kronecker product of two 1D precoders when both the base station and the wireless device are associated with 2D ULA antennas each including two axes, where each of the two 1D precoders corresponds to one of the two axes of the 2D ULA antennas.

Aspect 12 is the apparatus of aspect 11, where for each axis, the corresponding 1D precoder is a Legendre precoder when a number of receiving antenna elements is greater than or equal to a number of transmitting antenna elements along the axis, and the corresponding 1D precoder is a block-DFT precoder when the number of the receiving antenna elements is less than the number of the transmitting antenna elements along the axis.

Aspect 13 is the apparatus of any of aspects 1 to 8, where to select the one or more codebook-based precoders, the at least one processor is further configured to: select a block-DFT precoder when both the base station and the wireless device are associated with UCA antennas.

Aspect 14 The apparatus of any of aspects 1 to 13, further including a transceiver coupled to the at least one processor.

Aspect 15 is an apparatus for wireless communication at a wireless device including at least one processor coupled to a memory and configured to receive, from a base station, an indication of a second codebook-based precoder for transmission from the wireless device to the base station with LOS MIMO; and communicate with the base station with LOS MIMO based on one or more codebook-based precoders including the second codebook-based precoder.

Aspect 16 is the apparatus of aspect 15, the at least one processor being further configured to: transmit, to the base station, a device capability information message, where the device capability information message includes one or more indications of at least one of: LOS MIMO support, an antenna configuration, an antenna activation status, a panel configuration, an antenna geometry, a number of antennas, a number of panels, an antenna element distance matrix, antenna polarization information, a sounding capability, or an antenna alignment capability.

Aspect 17 is the apparatus of aspect 16, where the at least one processor is further configured to transmit the device capability information message via a UAI message.

Aspect 18 is the apparatus of any of aspects 15 to 17, where the one or more codebook-based precoders further include a first codebook-based precoder for transmission from the base station to the wireless device.

Aspect 19 is the apparatus of any of aspects 15 to 18, where the at least one processor is further configured to receive the indication of the second codebook-based precoder via one of an RRC configuration message, a downlink MAC-CE, or a DCI message.

Aspect 20 is the apparatus of any of aspects 15 to 19, where the codebook-based precoder used includes at least one of: a Legendre precoder, a block-DFT precoder, a block-Walsh precoder, a block-Legendre precoder, a Kronecker Legendre precoder, a Kronecker block-DFT precoder, or a Kronecker block-Walsh precoder.

Aspect 21 is the apparatus of any of aspects 15 to 20, where a Legendre precoder is used when both the base station and the wireless device are associated with 1D ULA antennas and a receiving device between the base station and the wireless device is associated with more antenna elements than a transmitting device between the base station and the wireless device, or is associated with an equal number of antenna elements as the transmitting device.

Aspect 22 is the apparatus of any of aspects 15 to 20, where a block-DFT precoder is used when both the base station and the wireless device are associated with 1D ULA antennas and a receiving device between the base station and the wireless device is associated with fewer antenna elements than a transmitting device between the base station and the wireless device.

Aspect 23 is the apparatus of any of aspects 15 to 20, where a precoder that is a Kronecker product of two 1D precoders is used when both the base station and the wireless device are associated with 2D ULA antennas each including two axes, and each of the two 1D precoders corresponds to one of the two axes of the 2D ULA antennas.

Aspect 24 is the apparatus of aspect 23, where for each axis, the corresponding 1D precoder is a Legendre precoder when a number of receiving antenna elements is greater than or equal to a number of transmitting antenna elements, and the corresponding 1D precoder is a block-DFT precoder when the number of the receiving antenna elements is less than the number of the transmitting antenna elements along the axis.

Aspect 25 is the apparatus of any of aspects 15 to 20, where a block-DFT precoder is used when both the base station and the wireless device are associated with UCA antennas.

Aspect 26 is the apparatus of any of aspects 15 to 25, where the wireless device includes one of a UE, an IAB node, a repeater, or a CPE.

Aspect 27 is the apparatus of any of aspects 15 to 26, further including a transceiver coupled to the at least one processor.

Aspect 28 is a method of wireless communication for implementing any of aspects 1 to 27.

Aspect 29 is an apparatus for wireless communication including means for implementing any of aspects 1 to 27.

Aspect 30 is a computer-readable medium storing computer executable code, where the code when executed by a processor causes the processor to implement any of aspects 1 to 27.

What is claimed is:

1. An apparatus for wireless communication at a base station, comprising:
   memory; and
   at least one processor coupled to the memory and configured to:
   identify a first antenna configuration of the base station and a second antenna configuration of a wireless device;
   select one or more codebook-based precoders for communication with the wireless device with line-of-sight (LOS) multiple-input-multiple-output (MIMO), wherein the selected one or more codebook-based precoders are associated with a relative relationship between the first antenna configuration or the second antenna configuration; and
   communicate with the wireless device with LOS MIMO based on the selected one or more codebook-based precoders.

2. The apparatus of claim 1, wherein to identify the second antenna configuration of the wireless device, the at least one processor is further configured to:
   receive, from the wireless device, a device capability information message,
   wherein the device capability information message comprises one or more indications of at least one of: LOS MIMO support, an antenna configuration, an antenna activation status, a panel configuration, an antenna geometry, a number of antennas, a number of panels, an antenna element distance matrix, antenna polarization information, a sounding capability, or an antenna alignment capability.

3. The apparatus of claim 2, wherein the at least one processor is further configured to receive the device capability information message via a user equipment (UE)-assisted information (UAI) message.

4. The apparatus of claim 1, wherein the one or more codebook-based precoders comprise a first codebook-based precoder for transmission from the base station to the wireless device and a second codebook-based precoder for transmission from the wireless device to the base station.

5. The apparatus of claim 4, wherein the at least one processor is further configured to:
   transmit, to the wireless device, an indication of the second codebook-based precoder.

6. The apparatus of claim 5, wherein the at least one processor is further configured to transmit the indication of the second codebook-based precoder to the wireless device via one of a radio resource control (RRC) configuration message, a downlink medium access control (MAC)—control element (CE) (MAC-CE), or a downlink control information (DCI) message.

7. The apparatus of claim 1, wherein the at least one processor is further configured to:
   identify LOS MIMO as suitable for communication between the base station and the wireless device based on at least one of: a channel condition, a mobility scenario between the base station and the wireless device, a distance between the base station and the wireless device, an antenna alignment condition, an antenna configuration, or a sounding capability.

8. The apparatus of claim 1, wherein to select the one or more codebook-based precoders, the at least one processor is further configured to:
   select at least one of: a Legendre precoder, a block-discrete Fourier transform (DFT) (block-DFT) precoder, a DFT precoder, a block-Walsh precoder, a Walsh precoder, a block-Legendre precoder, a Kronecker Legendre precoder, a Kronecker block-DFT precoder, or a Kronecker block-Walsh precoder.

9. The apparatus of claim 1, wherein to select the one or more codebook-based precoders, the at least one processor is further configured to:
   select a Legendre precoder when both the base station and the wireless device are associated with one-dimensional (1D) uniform linear array (ULA) antennas and a receiving device between the base station and the wireless device is associated with more antenna elements than a transmitting device between the base station and the wireless device, or is associated with an equal number of antenna elements as the transmitting device.

10. The apparatus of claim 1, wherein to select the one or more codebook-based precoders, the at least one processor is further configured to:
    select a block-discrete Fourier transform (DFT) (block-DFT) precoder when both the base station and the wireless device are associated with one-dimensional (1D) uniform linear array (ULA) antennas and a receiving device between the base station and the wireless device is associated with fewer antenna elements than a transmitting device between the base station and the wireless device.

11. The apparatus of claim 1, wherein to select the one or more codebook-based precoders, the at least one processor is further configured to:
select a precoder that is a Kronecker product of two one-dimensional (1D) precoders when both the base station and the wireless device are associated with two-dimensional (2D) uniform linear array (ULA) antennas each including two axes, wherein each of the two 1D precoders corresponds to one of the two axes of the 2D ULA antennas.

12. The apparatus of claim 11, wherein for each axis, the corresponding 1D precoder is a Legendre precoder when a number of receiving antenna elements is greater than or equal to a number of transmitting antenna elements along the axis, and the corresponding 1D precoder is a block-discrete Fourier transform (DFT) (block-DFT) precoder when the number of the receiving antenna elements is less than the number of the transmitting antenna elements along the axis.

13. The apparatus of claim 1, wherein to select the one or more codebook-based precoders, the at least one processor is further configured to:
select a block-discrete Fourier transform (DFT) (block-DFT) precoder when both the base station and the wireless device are associated with uniform circular array (UCA) antennas.

14. The apparatus of claim 1, further comprising a transceiver coupled to the at least one processor.

15. A method of wireless communication at a base station, comprising:
identifying a first antenna configuration of the base station and a second antenna configuration of a wireless device;
selecting one or more codebook-based precoders for communication with the wireless device with line-of-sight (LOS) multiple-input-multiple-output (MIMO), wherein the selected one or more codebook-based precoders are associated with a relative relationship between the first antenna configuration or the second antenna configuration; and
communicating with the wireless device with LOS MIMO based on the selected one or more codebook-based precoders.

16. An apparatus for wireless communication at a wireless device, comprising:
memory; and
at least one processor coupled to the memory and configured to:
receive, from a base station, an indication of a second codebook-based precoder for transmission from the wireless device to the base station with line-of-sight (LOS) multiple-input-multiple-output (MIMO); and
communicate with the base station with LOS MIMO based on one or more codebook-based precoders including the second codebook-based precoder, wherein the one or more codebook-based precoders are associated with a relative relationship between an antenna configuration of the base station and an antenna configuration of the wireless device.

17. The apparatus of claim 16, wherein the at least one processor is being further configured to:
transmit, to the base station, a device capability information message,
wherein the device capability information message comprises one or more indications of at least one of: LOS MIMO support, an antenna configuration, an antenna activation status, a panel configuration, an antenna geometry, a number of antennas, a number of panels, an antenna element distance matrix, antenna polarization information, a sounding capability, or an antenna alignment capability.

18. The apparatus of claim 17, wherein the at least one processor is further configured to transmit the device capability information message via a user equipment (UE)-assisted information (UAI) message.

19. The apparatus of claim 16, wherein the one or more codebook-based precoders further comprise a first codebook-based precoder for transmission from the base station to the wireless device.

20. The apparatus of claim 16, wherein the at least one processor is further configured to receive the indication of the second codebook-based precoder via one of a radio resource control (RRC) configuration message, a downlink medium access control (MAC)-control element (CE) (MAC-CE), or a downlink control information (DCI) message.

21. The apparatus of claim 16, wherein the codebook-based precoder used includes at least one of: a Legendre precoder, a block-discrete Fourier transform (DFT) (block-DFT) precoder, a block-Walsh precoder, a block-Legendre precoder, a Kronecker Legendre precoder, a Kronecker block-DFT precoder, or a Kronecker block-Walsh precoder.

22. The apparatus of claim 16, wherein a Legendre precoder is used when both the base station and the wireless device are associated with one-dimensional (1D) uniform linear array (ULA) antennas and a receiving device between the base station and the wireless device is associated with more antenna elements than a transmitting device between the base station and the wireless device, or is associated with an equal number of antenna elements as the transmitting device.

23. The apparatus of claim 16, wherein a block-discrete Fourier transform (DFT) (block-DFT) precoder is used when both the base station and the wireless device are associated with one-dimensional (1D) uniform linear array (ULA) antennas and a receiving device between the base station and the wireless device is associated with fewer antenna elements than a transmitting device between the base station and the wireless device.

24. The apparatus of claim 16, wherein a precoder that is a Kronecker product of two one-dimensional (1D) precoders is used when both the base station and the wireless device are associated with two-dimensional (2D) uniform linear array (ULA) antennas each including two axes, and each of the two 1D precoders corresponds to one of the two axes of the 2D ULA antennas.

25. The apparatus of claim 24, wherein for each axis, the corresponding 1D precoder is a Legendre precoder when a number of receiving antenna elements is greater than or equal to a number of transmitting antenna elements, and the corresponding 1D precoder is a block-discrete Fourier transform (DFT) (block-DFT) precoder when the number of the receiving antenna elements is less than the number of the transmitting antenna elements along the axis.

26. The apparatus of claim 16, wherein a block-discrete Fourier transform (DFT) (block-DFT) precoder is used when both the base station and the wireless device are associated with uniform circular array (UCA) antennas.

27. The apparatus of claim 16, wherein the wireless device comprises one of a user equipment (UE), an integrated access and backhaul (IAB) node, a repeater, or a customer premises equipment (CPE).

28. The apparatus of claim 16, further comprising a transceiver coupled to the at least one processor.

29. A method of wireless communication at a wireless device, comprising:
- receiving, from a base station, an indication of a second codebook-based precoder for transmission from the wireless device to the base station with line-of-sight (LOS) multiple-input-multiple-output (MIMO); and
- communicating with the base station with LOS MIMO based on one or more codebook-based precoders including the second codebook-based precoder, wherein the one or more codebook-based precoders are associated with a relative relationship between an antenna configuration of the base station and an antenna configuration of the wireless device.

30. The method of claim 29, further comprising:
- transmitting, to the base station, a device capability information message,
- wherein the device capability information message comprises one or more indications of at least one of: LOS MIMO support, an antenna configuration, an antenna activation status, a panel configuration, an antenna geometry, a number of antennas, a number of panels, an antenna element distance matrix, antenna polarization information, a sounding capability, or an antenna alignment capability.

* * * * *